(12) United States Patent
Aoi

(10) Patent No.: US 12,306,463 B2
(45) Date of Patent: May 20, 2025

(54) IMAGING LENS AND IMAGING APPARATUS

(71) Applicant: FUJIFILM Corporation, Tokyo (JP)

(72) Inventor: Toshihiro Aoi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 723 days.

(21) Appl. No.: 17/578,267

(22) Filed: Jan. 18, 2022

(65) Prior Publication Data
US 2022/0137331 A1 May 5, 2022

Related U.S. Application Data

(63) Continuation of application No. PCT/JP2020/026921, filed on Jul. 9, 2020.

(30) Foreign Application Priority Data

Jul. 25, 2019 (JP) ................. 2019-137037

(51) Int. Cl.
*G02B 9/08* (2006.01)
*G02B 3/04* (2006.01)

(52) U.S. Cl.
CPC .................. *G02B 9/08* (2013.01); *G02B 3/04* (2013.01)

(58) Field of Classification Search
CPC ............ G02B 9/08; G02B 3/04; G02B 1/118; G02B 9/64; G02B 13/14; G02B 13/18; G02B 13/005; G02B 9/60; G02B 13/146; G02B 13/006; G02B 9/06; G02B 13/04; G02B 27/0062; G02B 9/54; G02B 9/20; G02B 9/22; G02B 9/24; G02B 9/26; G02B 13/008; G02B 9/48
(Continued)

(56) References Cited

U.S. PATENT DOCUMENTS 5,172,275 A 12/1992 DeJager
2006/0285227 A1* 12/2006 Kobayashi ......... G02B 13/0035
359/740
(Continued)

FOREIGN PATENT DOCUMENTS

CN 104459945 A * 3/2015 ............. G01N 21/84
CN 105948483 A 9/2016
(Continued)

OTHER PUBLICATIONS

English translation of CN104459945 (Year: 2015).*
(Continued)

*Primary Examiner* — Thomas K Pham
*Assistant Examiner* — Kuei-Jen L Edenfield
(74) *Attorney, Agent, or Firm* — Studebaker Brackett PLLC

(57) ABSTRACT

The imaging lens consists of a positive first lens group, a stop, and a positive second lens group in order from the object side to the image side. An Ln lens, which is a negative lens having an absolute value of a curvature radius of an image side surface smaller than an absolute value of a curvature radius of an object side surface, is disposed at a position closest to the image side in the first lens group. In a Cartesian coordinate system in which a horizontal axis is an Abbe number ν and a vertical axis is a partial dispersion ratio θ, ν and θ of the Ln lens are included in a predetermined region.

21 Claims, 33 Drawing Sheets

EXAMPLE 1

(58) Field of Classification Search
USPC ........ 359/739–740, 708, 753, 717, 754–757, 359/759, 760, 763, 764, 767–769, 771, 359/772, 779, 780, 784, 791–794
See application file for complete search history.

(56) References Cited

U.S. PATENT DOCUMENTS

| | | | |
|---|---|---|---|
| 2010/0302431 | A1 | 12/2010 | Kitahara |
| 2011/0304929 | A1 | 12/2011 | Tsutsumi |
| 2013/0003169 | A1 | 1/2013 | Lee |
| 2014/0022437 | A1 | 1/2014 | Kuzuhara et al. |
| 2014/0022438 | A1 | 1/2014 | Kuzuhara et al. |
| 2015/0130985 | A1 | 5/2015 | Kawamura et al. |
| 2015/0177493 | A1 | 6/2015 | Asami |
| 2017/0010441 | A1 | 1/2017 | Kondo et al. |
| 2017/0031071 | A1 | 2/2017 | Ishibashi |
| 2019/0170986 | A1* | 6/2019 | Tsai ........................ G02B 9/06 |

FOREIGN PATENT DOCUMENTS

| | | | | |
|---|---|---|---|---|
| CN | 108627961 | A * | 10/2018 | ........... G02B 15/177 |
| CN | 109581626 | A * | 4/2019 | ........... G02B 13/004 |
| EP | 3474058 | A1 | 4/2019 | |
| JP | H05-505043 | A | 7/1993 | |
| JP | H11-119092 | A | 4/1999 | |
| JP | 2001-235679 | A | 8/2001 | |
| JP | 2004-354829 | A | 12/2004 | |
| JP | 2005-227507 | A | 8/2005 | |
| JP | 2007-304268 | A | 11/2007 | |
| JP | 2008-145584 | A | 6/2008 | |
| JP | 2008-164887 | A | 7/2008 | |
| JP | 2009-251543 | A | 10/2009 | |
| JP | 2010-276645 | A | 12/2010 | |
| JP | 2011-128273 | A | 6/2011 | |
| JP | 2013-015822 | A | 1/2013 | |
| JP | 2013-041205 | A | 2/2013 | |
| JP | 2013-218015 | A | 10/2013 | |
| JP | 2014-038304 | A | 2/2014 | |
| JP | 2014-038305 | A | 2/2014 | |
| JP | 2015-111254 | A | 6/2015 | |
| JP | 2015-125149 | A | 7/2015 | |
| JP | 2015-215494 | A | 12/2015 | |
| JP | 2016-045314 | A | 4/2016 | |
| JP | 2016-048319 | A | 4/2016 | |
| JP | 2017-003807 | A | 1/2017 | |
| JP | 2017-021185 | A | 1/2017 | |
| JP | 2017-026962 | A | 2/2017 | |
| JP | 2017-102353 | A | 6/2017 | |
| JP | 2017-215491 | A | 12/2017 | |
| JP | 2017-223754 | A | 12/2017 | |
| JP | 2018-180209 | A | 11/2018 | |
| JP | 2019-117423 | A | 7/2019 | |

OTHER PUBLICATIONS

English translation of CN1108627961 (Year: 2018).*
English translation of CN109581626 (Year: 2019).*
An Office Action mailed by China National Intellectual Property Administration on Nov. 4, 2023, which corresponds to Chinese Patent Application No. 202080052392.X and is related to U.S. Appl. No. 17/578,267; with English language translation.
An Office Action; "Notice of Reasons for Refusal," mailed by the Japanese Patent Office on Oct. 25, 2022, which corresponds to Japanese Patent Application No. 2019-137037 and is related to U.S. Appl. No. 17/578,267; with English language translation.
International Search Report issued in PCT/JP2020/026921; mailed Oct. 6, 2020.
International Preliminary Report on Patentability and Written Opinion issued in PCT/JP2020/026921; issued Jan. 25, 2022.
An Office Action mailed by the Japan Patent Office on Aug. 30, 2022, which corresponds to Japanese Patent Application No. 2019-137037 and is related to U.S. Appl. No. 17/578,267; with English translation.

* cited by examiner

EXAMPLE 2

EXAMPLE 3

EXAMPLE 4

EXAMPLE 5

EXAMPLE 6

EXAMPLE 7

EXAMPLE 9

EXAMPLE 10

EXAMPLE 2

EXAMPLE 4

EXAMPLE 7

EXAMPLE 10

EXAMPLE 4

EXAMPLE 5

EXAMPLE 9

IMAGING LENS AND IMAGING APPARATUS

CROSS-REFERENCE TO RELATED APPLICATIONS

This application is a continuation application of International Application No. PCT/JP2020/026921, filed on Jul. 9, 2020, which is incorporated herein by reference in its entirety. Further, this application claims priority from Japanese Patent Application No. 2019-137037, filed on Jul. 25, 2019. Each application above is hereby expressly incorporated by reference, in its entirety, into the present application.

BACKGROUND

Technical Field

The present disclosure relates to an imaging lens and an imaging apparatus.

Related Art

In the related art, near-infrared light has been used for imaging of factory automation (FA) cameras, machine vision (MV) cameras, surveillance cameras, in-vehicle cameras, and the like. For example, in FA and MV applications, near-infrared light has been used for object identification and/or inspection. In surveillance applications, near-infrared light has been used for nighttime imaging and imaging in a bad field of view such as fog or smoke. The near infrared region described herein refers to a band having a wavelength of 700 nm to 2500 nm.

As an imaging lens conscious of near-infrared light, for example, lens systems described in JP2011-128273A and JP2004-354829A have been known. JP2011-128273A describes a lens system consisting of, in order from the object side, a first group having a positive or negative refractive power, a second group having a positive refractive power, and a third group having a positive or negative refractive power. JP2004-354829A describes a lens system composed of a front group lens having a negative refractive power and a rear group lens having a positive refractive power with a stop interposed therebetween.

SUMMARY

In the near-infrared light, short wave infra-red (SWIR) light, which can be classified as a band having a wavelength of 1000 nm to 2500 nm, is highly useful. In recent years, there has been an increasing demand for a lens system in which chromatic aberration is corrected throughout a wavelength band from the visible region to the SWIR region. In order to keep other optical performances favorable while achieving such wideband chromatic aberration correction, the lens system tends to be large. However, in recent years, there has been an increase in demand for compactness of the device.

The present disclosure has been made in view of the above circumstances, and its object is to provide an imaging lens, which is compatible with the wavelength band from the visible region to the SWIR region and is capable of achieving high performance while suppressing an increase in size of the lens system, and an imaging apparatus comprising the imaging lens.

The imaging lens according to an aspect of the present disclosure consists of, in order from an object side to an image side: a first lens group that has a positive refractive power; a stop; and a second lens group that has a positive refractive power. An Ln lens, which is a negative lens having an absolute value of a curvature radius of an image side surface smaller than an absolute value of a curvature radius of an object side surface, is disposed at a position closest to the image side in the first lens group, and assuming that a refractive index of each lens of the first lens group and the second lens group at a wavelength of 435.83 nm is ng, a refractive index thereof at a wavelength of 1529.58 nm is na, and a refractive index thereof at a wavelength of 2325.42 nm is nb, and an Abbe number ν and a partial dispersion ratio θ are respectively defined by $$\nu = (na - 1)/(ng - nb), \text{ and}$$
$$\theta = (na - nb)/(ng - nb).$$

In a Cartesian coordinate system where a horizontal axis is ν and a vertical axis is θ, ν and θ of the Ln lens are included in a common region of three regions including
a first region represented by $\theta > 0.0060 \times \nu + 0.1712$,
a second region represented by $\theta < 0.0327 \times \nu - 0.0635$, and
a third region represented by $\nu < 14.8$.
In the imaging lens of the above-mentioned aspect,
it is preferable that ν and θ of the Ln lens are included in the common region of the three regions including
a fourth region represented by $\theta > 0.0102 \times \nu + 0.1344$,
a fifth region represented by $\theta < 0.0242 \times \nu + 0.0106$, and
a sixth region represented by $\nu < 14.3$.

In the imaging lens of the above-mentioned aspect, assuming that an average of ν of all positive lenses of the imaging lens is νPave, an average of ν of all negative lenses of the imaging lens is νNave, an average of θ of all the positive lenses of the imaging lens is θPave, and an average of θ of all the negative lenses of the imaging lens is θNave, it is preferable that Conditional Expressions (1) and (2) are satisfied. Further, it is more preferable that Conditional Expressions (1) and (2) are satisfied, and then at least one of Conditional Expressions (1-1) or (2-1) is satisfied.

$$1 < \nu Pave - \nu Nave < 4 \tag{1}$$
$$-0.05 < \theta Pave - \theta Nave < 0 \tag{2}$$
$$1.5 < \nu Pave - \nu Nave < 3.5 \tag{1-1}$$
$$-0.04 < \theta Pave - \theta Nave < -0.002 \tag{2-1}$$

In the imaging lens of the above-mentioned aspect, assuming that an open F number of the imaging lens is FNo, an angle, which is formed between an axis parallel to an optical axis and a principal ray incident on an image plane at a maximum image height, is CRA, an angle, which is formed between the axis and a marginal ray farthest from the optical axis among the rays incident on the image plane at the maximum image height in a state where the stop is open, is URA, a sign of CRA in a case where the principal ray is on an optical axis side is negative and a sign of CRA in a case where the principal ray is on a side opposite to the optical axis side is positive with reference to the axis passing through the maximum image height, a sign of URA in a case where the marginal ray is on the optical axis side is negative and a sign of URA in a case where the marginal ray is on the side opposite to the optical axis side is positive with reference to the axis passing through the maximum image height, and units of CRA and URA are degrees, it is preferable that Conditional Expressions (3), (4), and (5) are satisfied. Further, it is more preferable that Conditional Expressions (3), (4), and (5) are satisfied, and then at least one of Conditional Expressions (3-1), (4-1), or (5-1) is satisfied.

$$FNo \leq 1.4 \quad (3)$$

$$0 \leq |CRA| < 8 \quad (4)$$

$$0.4 < \frac{URA - CRA}{(180/\pi) \times \arcsin\{1/(2 \times FNo)\}} < 0.95 \quad (5)$$

$$1 \leq FNo \leq 1.3 \quad (3\text{-}1)$$

$$0 \leq |CRA| < 7 \quad (4\text{-}1)$$

$$0.5 < \frac{URA - CRA}{(180/\pi) \times \arcsin\{1/(2 \times FNo)\}} < 0.08 \quad (5\text{-}1)$$

In the imaging lens of the above-mentioned aspect, assuming that a focal length of the Ln lens at a wavelength of 1529.58 nm is fn, and a focal length of the imaging lens at a wavelength of 1529.58 nm is f, it is preferable that Conditional Expression (6) is satisfied, and it is more preferable that Conditional Expression (6-1) is satisfied.

$$-0.8 < fn/f < -0.5 \quad (6)$$

$$-0.75 < fn/f < -0.55 \quad (6\text{-}1)$$

In the imaging lens of the above-mentioned aspect, assuming that a sum of a distance on an optical axis from a lens surface closest to the object side in the imaging lens to a lens surface closest to the image side in the imaging lens and a back focal length at an air conversion distance of the imaging lens at a wavelength of 1529.58 nm is TL, and a focal length of the imaging lens at a wavelength of 1529.58 nm is f, it is preferable that Conditional Expression (7) is satisfied, and it is more preferable that Conditional Expression (7-1) is satisfied.

$$1.5 < TL/f < 2.5 \quad (7)$$

$$1.8 < TL/f < 2.2 \quad (7\text{-}1)$$

In the imaging lens of the above-mentioned aspect, assuming that a focal length of the first lens group at a wavelength of 1529.58 nm is fG1, and a focal length of the second lens group at a wavelength of 1529.58 nm is fG2, it is preferable that Conditional Expression (8) is satisfied.

$$0.02 < fG2/fG1 < 0.3 \quad (8)$$

In the imaging lens of the above-mentioned aspect, it is preferable that two groups of cemented lenses in which a negative lens and a positive lens are cemented in order from the object side are disposed successively in order from a position closest to the object side to the image side.

It is preferable that the Ln lens of the imaging lens of the above-mentioned aspect is a single lens.

In the imaging lens of the above-mentioned aspect, it is preferable that a positive meniscus lens of which an image side surface is a convex surface is disposed closest to the object side in the second lens group.

It is preferable that the number of lenses included in the first lens group of the imaging lens of the above-mentioned aspect is 6 or less. Further, it is preferable that the number of lenses included in the second lens group of the imaging lens of the above-mentioned aspect is 8 or less.

An imaging apparatus according to another aspect of the present disclosure comprises the imaging lens according to the above-mentioned aspect of the present disclosure.

In the present specification, it should be noted that the terms "consisting of" and "consists of" mean that the lens may include not only the above-mentioned components but also lenses substantially having no refractive powers, optical elements, which are not lenses, such as a stop, a filter, and a cover glass, and mechanism parts such as a lens flange, a lens barrel, an imaging element, and a camera shaking correction mechanism.

It should be noted that, in the present specification, the term "~ group having a positive refractive power" means that the group has a positive refractive power as a whole. Similarly, the term "~ group having a negative refractive power" means that the group has a negative refractive power as a whole. The term "a lens having a positive refractive power" and the term "a positive lens" are synonymous. The term "a lens having a negative refractive power" and the term "negative lens" are synonymous. The term "~ lens group" is not limited to a configuration consisting of a plurality of lenses, but may consist of only one lens. The term "single lens" means one uncemented lens.

A compound aspherical lens (that is, a lens in which a spherical lens and an aspherical film formed on the spherical lens are integrally formed and function as one aspherical lens as a whole) is not regarded as cemented lenses, but the compound aspherical lens is regarded as one lens. The sign of refractive power, the surface shape, and the curvature radius of a lens including an aspherical surface are considered in terms of the paraxial region.

The "focal length" used in a conditional expression is a paraxial focal length. The values used in Conditional Expressions are values in a case where the wavelength of 1529.58 nm is used as a reference in a state where the object at infinity is in focus unless otherwise specified. Regarding aberrations, the term "high order" means 5th or more order. In the present specification, "near infrared" means a band having a wavelength of 700 nm to 2500 nm, and "SWIR" means a band having a wavelength of 1000 nm to 2500 nm. The "nm" used as a unit of wavelength is nanometer.

According to the present disclosure, it is possible to provide an imaging lens, which is compatible with the wavelength band from the visible region to the SWIR region and is capable of achieving high performance while suppressing an increase in size of the lens system, and an imaging apparatus comprising the imaging lens.

DESCRIPTION OF EMBODIMENTS

Figure 1:
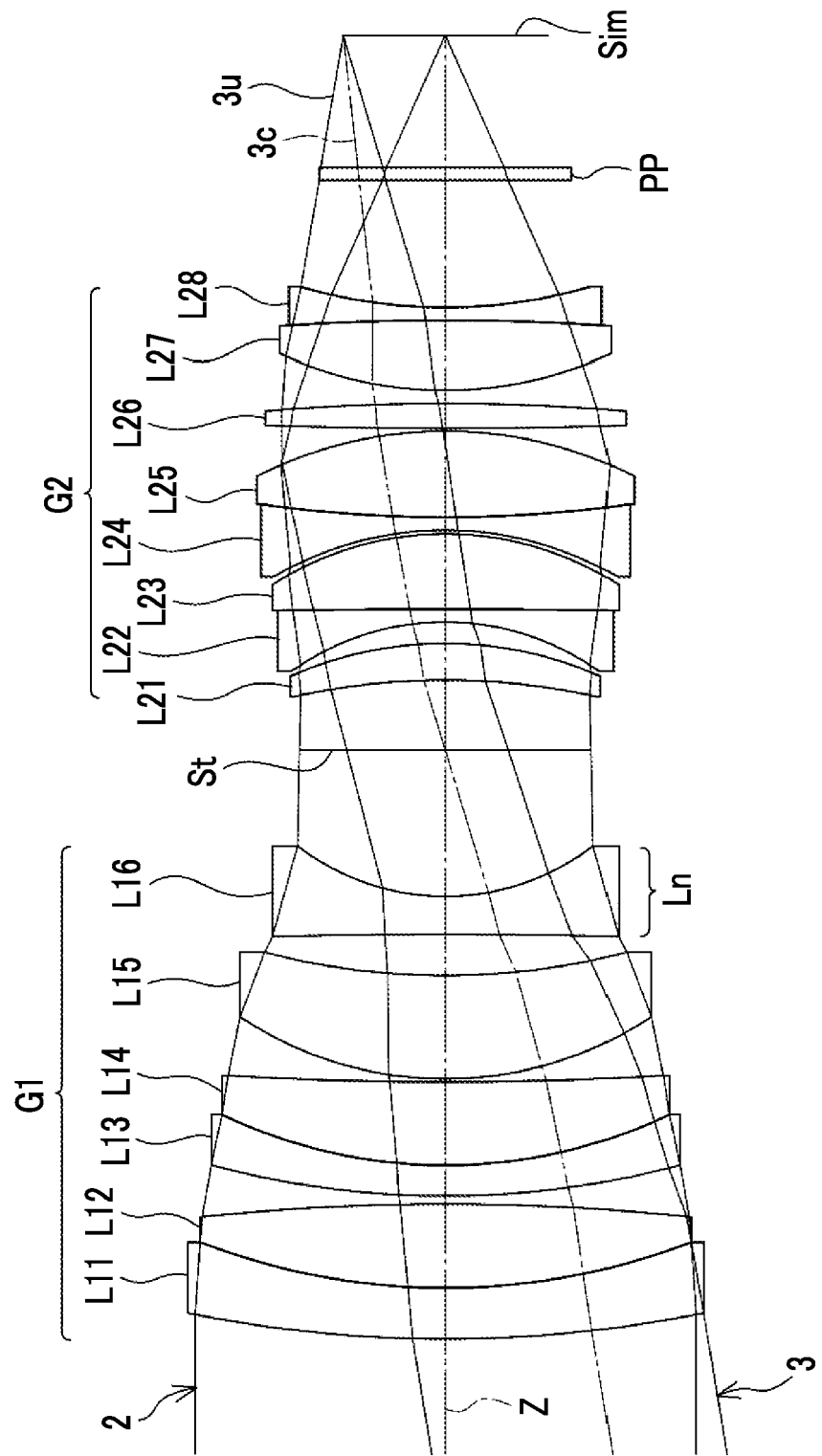
FIG. 1 is a cross-sectional view corresponding to the imaging lens according to Example 1 of the present disclosure and showing a configuration and luminous flux of an imaging lens according to an embodiment of the present disclosure.

Hereinafter, embodiments of the present disclosure will be described in detail with reference to the accompanying drawings. FIG. 1 shows a configuration of a cross section including an optical axis Z of an imaging lens according to an embodiment of the present disclosure. The example shown in FIG. 1 corresponds to the imaging lens according to Example 1 to be described later. In FIG. 1, the left side is the object side, the right side is the image side, and a state where the infinite distance object is in focus is shown. FIG. 1 also shows on-axis luminous flux 2 and luminous flux with the maximum image height 3 as the luminous flux.

FIG. 1 shows an example in which, assuming that an imaging lens is applied to an imaging apparatus, an optical member PP having a parallel plate shape is disposed on the image side of the imaging lens. The optical member PP is a member assumed to include various filters, a cover glass, and/or the like. The various filters include, for example, a low pass filter, an infrared cut filter, and a filter that cuts a specific wavelength band. The optical member PP has no refractive power, and the optical member PP may be configured to be omitted.

The imaging lens of the present disclosure consists of, in order from the object side to the image side, a first lens group G1 that has a positive refractive power, an aperture stop St, and a second lens group G2 that has a positive refractive power. It should be noted that the aperture stop St shown in FIG. 1 does not indicate a shape thereof but indicates a position thereof on the optical axis.

For example, in the example shown in FIG. 1, the first lens group G1 consists of six lenses L11 to L16 in order from the object side to the image side, and the second lens group G2 consists of eight lenses L21 to L28 in order from the object side to the image side.

By forming the first lens group G1 and the second lens group G2 as lens groups having positive refractive powers, there is an advantage in reduction in size and weight reduction. Short range imaging is emphasized in FA and MV applications. Compared with the case where the refractive power of the first lens group G1 is made negative, by making the refractive power of the first lens group G1 positive, spread of the luminous flux emitted from the first lens group G1 during short range imaging can be reduced. Therefore, it is possible to suppress increases in diameter and weight of the second lens group G2. Further, since the spread of the luminous flux from the first lens group G1 can be reduced, it is not necessary to increase the refractive power provided to the lens of the second lens group G2 in order to converge the spread luminous flux. As a result, the amounts of various aberrations can be suppressed.

At a position closest to the image side in the first lens group G1, an Ln lens Ln, which is a negative lens having an absolute value of the curvature radius of the image side surface smaller than an absolute value of the curvature radius of the object side surface, is disposed. The image side surface of the Ln lens Ln is concave. In the example shown in FIG. 1, the lens L16 corresponds to the Ln lens Ln.

In the imaging lens of the present disclosure, a material of the lens is selected in consideration of the wavelength band of the visible region and the SWIR region, and in particular, the Abbe number and the partial dispersion ratio are set as described later. It is assumed that a refractive index of each lens of the first lens group G1 and the second lens group G2 at the g line (a wavelength of 435.83 nm) is ng, a refractive index thereof at a wavelength of 1529.58 nm is na, and the refractive index thereof at a wavelength of 2325.42 nm is nb. Then, for each lens, an Abbe number $\nu$ and a partial dispersion ratio $\theta$ are respectively defined by $$\nu = (na - 1)/(ng - nb), \text{ and}$$

$$\theta = (na - nb)/(ng - nb).$$

In a case of selecting the material for the Ln lens Ln, in a Cartesian coordinate system where a horizontal axis is $\nu$ and a vertical axis is $\theta$, the material of the Ln lens Ln is selected such that $\nu$ and $\theta$ of the Ln lens Ln are included in a common region of three regions including
 a first region represented by $\theta > 0.0060 \times \nu + 0.1712$,
 a second region represented by $\theta < 0.0327 \times \nu - 0.0635$, and
 a third region represented by $\nu < 14.8$.

Figure 2:
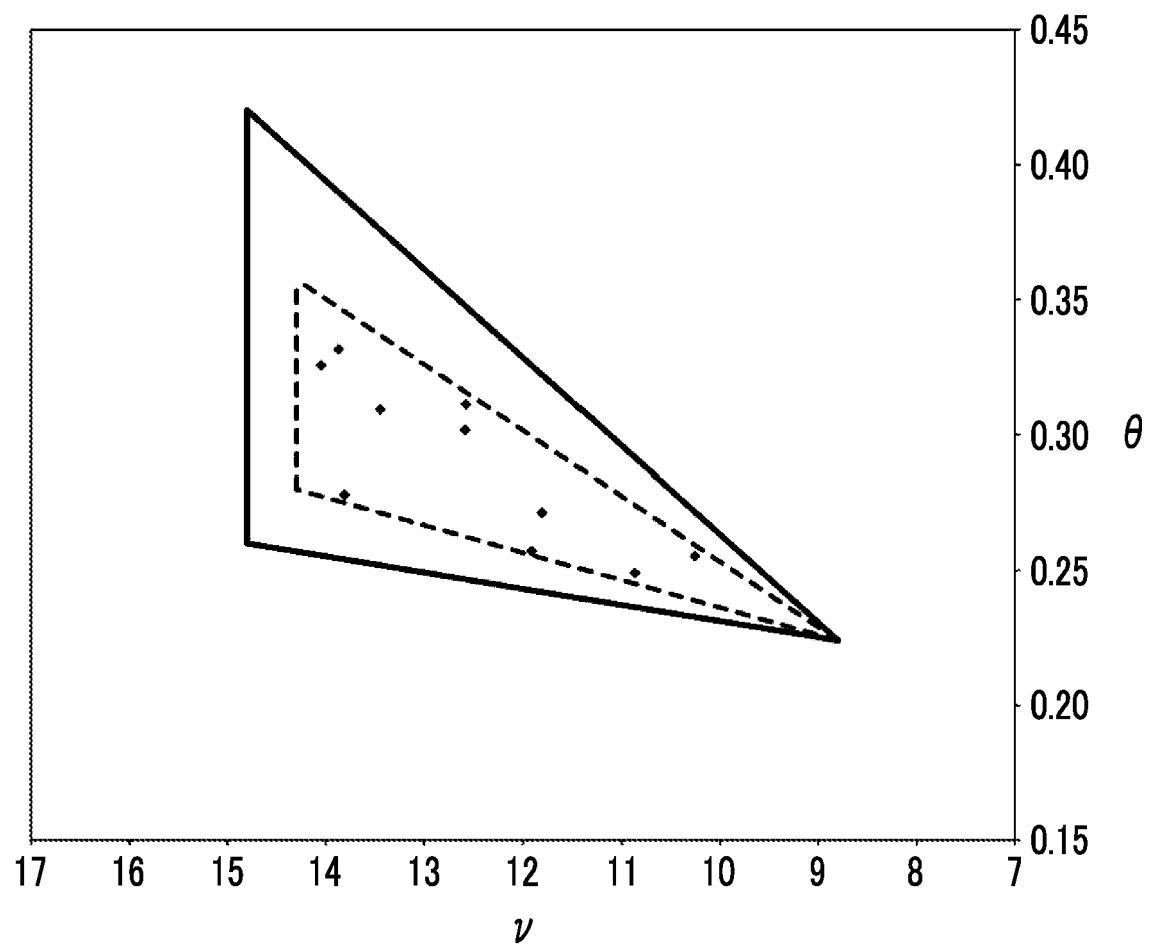
FIG. 2 is a diagram for explaining a material of an Ln lens.

FIG. 2 shows an example of a Cartesian coordinate system. The triangular region surrounded by the solid line in FIG. 2 corresponds to the common region of the above-mentioned three regions.

By selecting the material in the first region, it is easy to correct first-order chromatic aberration and the remaining second-order spectrum. In a case where it is difficult to correct first-order chromatic aberration and the remaining second-order spectrum, in a case where they are intended to be corrected, spherical aberration increases. By selecting the material in the second region, it is easy to correct the remaining second-order spectrum. In a case where it is difficult to correct the remaining second-order spectrum and the remaining second-order spectrum is intended to be corrected, spherical aberration, astigmatism, and barrel distortion increase. By selecting the material in the third region, it is easy to reduce first-order chromatic aberration and lateral chromatic aberration. Correcting first-order chromatic aberration and lateral chromatic aberration in a case where the aberrations increase, spherical aberration and astigmatism increase, and distortion deteriorates.

By forming the Ln lens Ln with materials in the common region common to the first, second, and third regions, in a wide wavelength band from the visible region to the SWIR region, first-order longitudinal chromatic aberration and second-order chromatic aberration, lateral chromatic aberration, spherical aberration, astigmatism, and distortion can be easily corrected in a well-balanced manner. As a result, there is an advantage in achieving high performance.

In order to obtain more favorable characteristics, in the above-mentioned Cartesian coordinate system,
 it is preferable to select the material such that $\nu$ and $\theta$ of the Ln lens Ln are included in the common region of the three regions including
 a fourth region represented by $\theta > 0.0102 \times \nu + 0.1344$,
 a fifth region represented by $\theta < 0.0242 \times \nu + 0.0106$, and
 a sixth region represented by $\nu < 14.3$.

The triangular region surrounded by the broken line in FIG. 2 corresponds to the common region of the three regions of the fourth, fifth, and sixth regions.

It is preferable that the Ln lens Ln is a single lens that is not cemented. In such a case, the degree of freedom in design is higher than that in the case of cementing. As a result, there is an advantage in satisfactorily correcting coma flare.

Regarding a focal length of the Ln lens Ln, assuming that the focal length of the Ln lens Ln at a wavelength of 1529.58 nm is fn, and a focal length of the imaging lens at a wavelength of 1529.58 nm is f, it is preferable that the focal lengths are set such that Conditional Expression (6) is satisfied. By not allowing the corresponding value of Conditional Expression (6) to be equal to or less than the lower limit, the refractive power of the Ln lens Ln is prevented from becoming excessively weak. As a result, there is an advantage in correcting coma aberration and field curvature. By not allowing the corresponding value of Conditional Expression (6) to be equal to or greater than the upper limit, the refractive power of the Ln lens Ln is prevented from becoming excessively strong. Thus, occurrence of high-order spherical aberration can be suppressed, and difference between the aberration shapes of the wavelengths can be made smaller. Therefore, it is easy to obtain high performance in a wide wavelength band. Further, in a case of a configuration in which Conditional Expression (6-1) is satisfied, it is possible to obtain more favorable characteristics.

$$-0.8 < fn/f < -0.5 \tag{6}$$

$$-0.75 < fn/f < -0.55 \tag{6-1}$$

Furthermore, it is preferable that the imaging lens of the present disclosure has at least one of the configurations described later. Assuming that an average of $\nu$ of all positive lenses of the imaging lens is $\nu$Pave, an average of $\nu$ of all negative lenses of the imaging lens is $\nu$Nave, it is preferable the imaging lens satisfies Conditional Expression (1). By satisfying Conditional Expression (1), there is an advantage in correcting first-order chromatic aberration with respect to the g line and the light having a wavelength of 2325.42 nm. Further, in a case of a configuration in which Conditional Expression (1-1) is satisfied, it is possible to obtain more favorable characteristics.

$$1 < vPave - vNave < 4 \quad (1)$$

$$1.5 < vPave - vNave < 3.5 \quad (1\text{-}1)$$

Assuming that an average of θ of all the positive lenses of the imaging lens is θPave, and an average of θ of all the negative lenses of the imaging lens is θNave, it is preferable that the imaging lens satisfies Conditional Expression (2). By satisfying Conditional Expression (2), there is an advantage in correcting the remaining second-order spectrum. Further, in a case of a configuration in which Conditional Expression (2-1) is satisfied, it is possible to obtain more favorable characteristics.

$$-0.05 < \theta Pave - \theta Nave < 0 \quad (2)$$

$$-0.04 < \theta Pave - \theta Nave < -0.002 \quad (2\text{-}1)$$

It is more preferable that the imaging lens satisfies Conditional Expressions (1) and (2) simultaneously. It is even more preferable that Conditional Expressions (1) and (2) are simultaneously satisfied, and at least one of Conditional Expression (1-1) or (2-1) is satisfied.

Assuming that an open F number of the imaging lens is FNo, it is preferable that the imaging lens satisfies Conditional Expression (3). By satisfying Conditional Expression (3), there is an advantage in ensuring the amount of light. More specifically, for example, there is an advantage in ensuring the amount of light in a case of performing high-speed inspection in FA applications, ensuring the amount of light at the time of imaging at night in surveillance applications and the like, and ensuring the amount of light at the time of imaging the reflected light of night airglow (night glow). Further, it is more preferable that the imaging lens satisfies Conditional Expression (3-1). By setting the corresponding value of Conditional Expression (3-1) to be equal to or greater than the lower limit of Conditional Expression (3-1) as compared with the case where the corresponding value of Conditional Expression (3-1) is less than the lower limit of Conditional Expression (3-1), it is easy to correct various aberrations starting from spherical aberration. As a result, there is an advantage in achieving high performance, and it is possible to suppress an increase in diameter and weight of the imaging lens. By setting the corresponding value of Conditional Expression (3-1) to be equal to or less than the upper limit, it is possible to obtain more favorable characteristics for the above-mentioned effect relating to Conditional Expression (3).

$$FNo \leq 1.4 \quad (3)$$

$$1 \leq FNo \leq 1.3 \quad (3\text{-}1)$$

Figure 3:
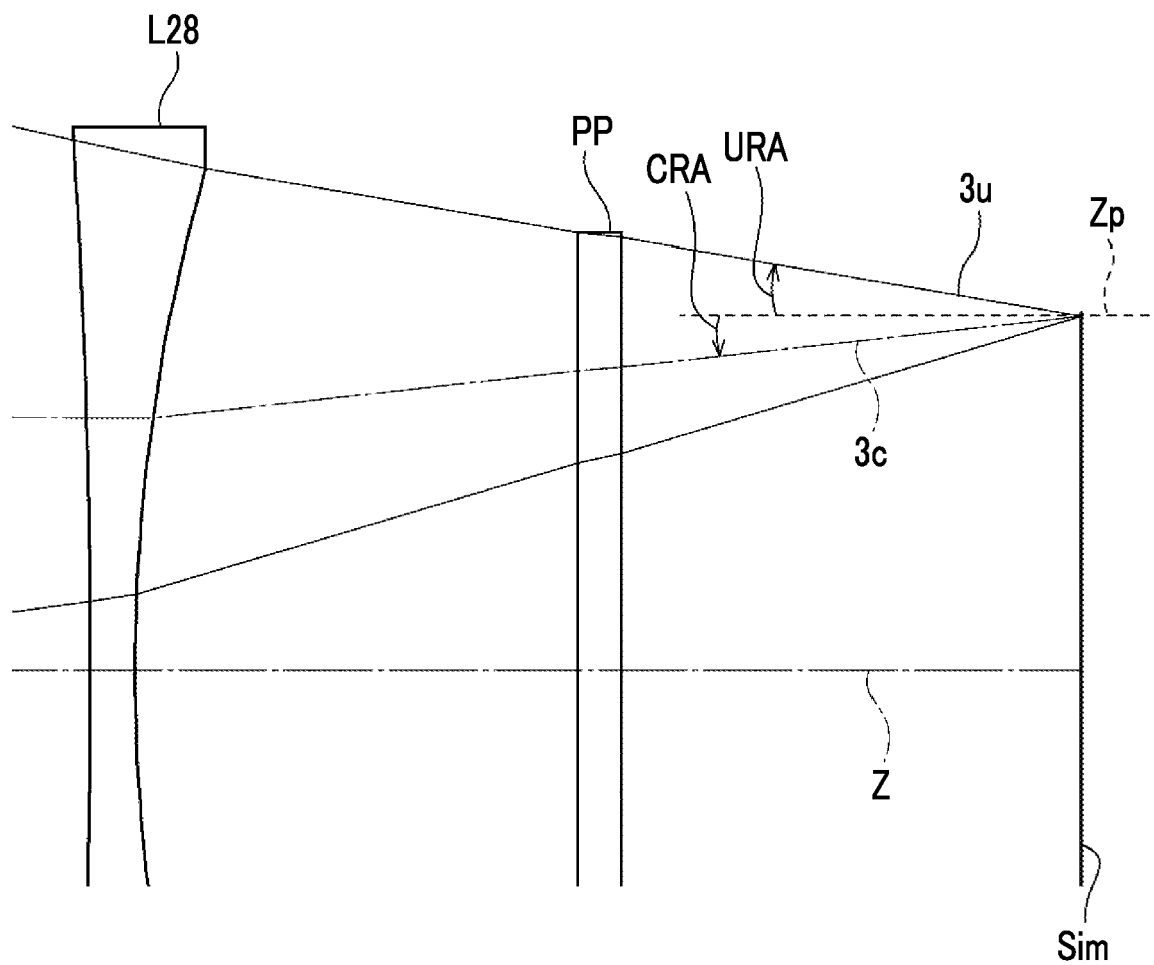
FIG. 3 is a diagram for explaining CRA and URA.

Assuming that an angle, which is formed between an axis Zp parallel to an optical axis Z and a principal ray 3c incident on an image plane Sim at a maximum image height, is CRA and the unit of CRA is degrees, it is preferable that the imaging lens satisfies Conditional Expression (4). For example, FIG. 3 shows a partially enlarged view including the principal ray 3c at the maximum image height, the axis Zp parallel to the optical axis Z, and the CRA. Conditional Expression (4) is an expression relating to the telecentricity of the ray emitted from the lens system. By satisfying Conditional Expression (4), the absolute value of the incident angle with respect to the light-receiving surface of the sensor disposed on the image plane Sim can be reduced. Therefore, a decrease in peripheral light amount ratio can be suppressed. Further, in a case of a configuration in which Conditional Expression (4-1) is satisfied, it is possible to obtain more favorable characteristics.

$$0 \leq |CRA| < 8 \quad (4)$$

$$0 \leq |CRA| < 7 \quad (4\text{-}1)$$

Assuming that an angle, which is formed between the axis Zp parallel to the optical axis and a marginal ray 3u farthest from the optical axis among the rays incident on the image plane Sim at the maximum image height in a state where the aperture stop St is open, is URA, it is preferable that the imaging lens satisfies Conditional Expression (5). The FNo and CRA used in Conditional Expression (5) are respectively the same as those used in Conditional Expression (3) and (4). FIG. 3 shows an example of the marginal ray 3u and URA. The marginal ray 3u in FIG. 3 is a so-called upper side ray or upper ray. Generally, as the F number becomes smaller, a decrease in peripheral light amount ratio tends to increase, and Conditional Expression (5) is an expression for suppressing the decrease. By not allowing the corresponding value of Conditional Expression (5) to be equal to or less than the lower limit, there is an advantage in preventing the peripheral light amount ratio from becoming excessively small. By not allowing the corresponding value of Conditional Expression (5) to be equal to or greater than the upper limit, it is possible to prevent the height of the marginal ray 3u emitted from the lens closest to the image side from becoming excessively high. As a result, there is an advantage in suppressing an increase in diameter. Further, in a case of a configuration in which Conditional Expression (5-1) is satisfied, it is possible to obtain more favorable characteristics.

$$0.4 < \frac{URA - CRA}{(180/\pi) \times \arcsin\{1/(2 \times FNo)\}} < 0.95 \quad (5)$$

$$0.5 < \frac{URA - CRA}{(180/\pi) \times \arcsin\{1/(2 \times FNo)\}} < 0.08 \quad (5\text{-}1)$$

The codes of CRA and URA described above are defined as follows. That is, a sign of CRA in a case where the principal ray 3c is on the optical axis side is negative and a sign of CRA in a case where the principal ray 3c is on a side opposite to the optical axis side is positive, with reference to the axis Zp parallel to the optical axis passing through the maximum image height. A sign of URA in a case where the marginal ray 3u is on the optical axis side is negative and a sign of URA in a case where the marginal ray 3u is on a side opposite to the optical axis side is positive, with reference to the axis Zp parallel to the optical axis passing through the maximum image height. The units of CRA and URA are degrees, and the values of CRA and URA are in the range of −90 degrees to +90 degrees. FIG. 3 shows an example in which CRA is set as a negative value and URA is set as a positive value.

It is more preferable that the imaging lens simultaneously satisfies Conditional Expressions (3), (4), and (5). It is even more preferable to satisfy at least one of Conditional Expressions (3-1), (4-1), and (5-1) after simultaneously satisfying Conditional Expressions (3), (4), and (5).

Assuming that a sum of a distance on the optical axis from the lens surface closest to the object side in the imaging lens to the lens surface closest to the image side in the imaging lens and a back focal length at an air conversion distance of the imaging lens at a wavelength of 1529.58 nm is TL, and a focal length of the imaging lens at a wavelength of 1529.58 nm is f, it is preferable that the imaging lens satisfies Conditional Expression (7). By not allowing the corresponding value of Conditional Expression (7) to be equal to or less than the lower limit, the total length of the lens system is prevented from becoming excessively short. Therefore, it is possible to prevent the power of each lens from becoming excessively strong. As a result, occurrence of high-order spherical aberration of each wavelength can be suppressed, and it is easy to correct chromatic aberration in a wide wavelength band. By not allowing the corresponding value of Conditional Expression (7) to be equal to or greater than the upper limit, it is possible to suppress an increase in total length of the lens system. Further, in a case of a configuration in which Conditional Expression (7-1) is satisfied, it is possible to obtain more favorable characteristics.

$$1.5 < TL/f < 2.5 \qquad (7)$$

$$1.8 < TL/f < 2.2 \qquad (7\text{-}1)$$

Regarding the distribution of the refractive power between the first lens group G1 and the second lens group G2, assuming that a focal length of the first lens group G1 at a wavelength of 1529.58 nm is fG1 and a focal length of the second lens group G2 at a wavelength of 1529.58 nm is fG2, it is preferable that the imaging lens satisfies Conditional Expression (8). By satisfying Conditional Expression (8), the balance of the refractive power of each lens group can be kept favorable. Therefore, lateral chromatic aberration and distortion can be easily corrected. Further, in a case of a configuration in which Conditional Expression (8-1) is satisfied, it is possible to obtain more favorable characteristics.

$$0.02 < fG2/fG1 < 0.3 \qquad (8)$$

$$0.05 < fG2/fG1 < 0.25 \qquad (8\text{-}1)$$

In the imaging lens, it is preferable that two groups of cemented lenses in which a negative lens and a positive lens are cemented in order from the object side are disposed successively in order from a position closest to the object side to the image side. In such a case, there is an advantage in achieving a high-performance lens system compatible with a wide wavelength band from the visible region to the near infrared region. Further, in such a case, the eccentric sensitivity can be lowered as compared with the case where the negative lens and the positive lens of each cemented lens are not cemented and are disposed close to each other with an air spacing interposed therebetween. Therefore, this configuration is able to contribute to improvement of the yield. Further, occurrence of ghost can be suppressed.

It is preferable that a positive meniscus lens of which an image side surface is a convex surface is disposed closest to the object side in the second lens group G2. In such a case, the remaining astigmatism occurring in the first lens group G1 can be satisfactorily corrected.

FIG. 1 shows an example in which the first lens group G1 consists of six lenses and the second lens group G2 consists of eight lenses. However, the number of lenses constituting each lens group can bet set to the number of lenses different from the example shown in FIG. 1. However, in a case where the number of lenses included in the first lens group G1 is six or less, it is possible to suppress an increase in size and weight of the lens system. As a result, there is an advantage in cost reduction. Similarly, in a case where the number of lenses included in the second lens group G2 is eight or less, it is possible to suppress an increase in size and weight of the lens system. As a result, there is an advantage in cost reduction.

Specifically, for example, the first lens group G1 can be configured to consist of, in order from the object side to the image side: two groups of cemented lenses in which the negative lens and the positive lens are cemented in order from the object side and the cemented surface is convex toward the object side; a positive meniscus lens having a convex surface facing toward the object side; and a negative lens having a concave surface facing toward the image side. The second lens group G2 can be configured to consist of, in order from the object side to the image side: a positive lens having a concave surface facing toward the object side; two groups of cemented lenses in which a negative lens and a positive lens are cemented in order from the object side; a positive lens; and a cemented lens in which a positive lens and a negative lens are cemented in order from the object side. Alternatively, the second lens group G2 can be configured to consist of, in order from the object side to the image side: a positive lens having a concave surface facing the object side; and three groups of cemented lenses in which a negative lens and a positive lens are cemented in order from the object side.

Any surface of the imaging lens may be aspherical in order to improve a degree of freedom in design and correct aberrations. The aspherical surface may be formed through grinding or molding. Further, a compound aspherical lens may be used as a lens having an aspherical surface.

In order to correct chromatic aberration, any lens group of the imaging lens may be configured to have a refractive index distribution type lens such as a diffractive optical element or a gradient index lens (GRIN lens).

It is preferable that the imaging lens has a focusing function. The imaging lens may be configured such that, during focusing, the entire imaging lens moves integrally, at least one lens group moves, or a part of the imaging lens consisting of at least one lens moves.

The imaging lens may be provided with an antireflection film in order to maintain the transmittance in a wide wavelength band. The antireflection film may be used, which suppresses reflection in the entire wavelength band to be used, or may be used, which suppresses reflection in some wavelength bands by selecting the wavelength bands to be used. The antireflection film may use a special coating in which a nano-level structure is formed on the lens surface in a moth-eye shape and is configured to suppress reflection.

In a case of manufacturing an imaging lens, a mechanism for adjusting the flange focal length may be provided in order to align the imaging position. Further, in a case of manufacturing an imaging lens, a part of an imaging lens consisting of at least one lens or a lens group may be moved to align the imaging position.

The above-mentioned preferred configurations and available configurations including the configurations relating to Conditional Expressions may be any combination, and it is preferable to appropriately selectively adopt the configurations in accordance with required specification. According to the imaging lens of the present disclosure, while suppressing the enlargement of the lens system, it is possible to cope with the wavelength band from the visible region to the SWIR region, and it is possible to achieve high performance Since SWIR light is able to transmit fog and smoke more easily than light having a wavelength of 700 nm to 1000 nm, imaging using the SWIR light is able to obtain a lot of information. In a case where the optical system has a small F number and is compatible with the SWIR light, it is possible to perform imaging using nighttime airglow having a peak near a wavelength of 1600 nm. Further, the SWIR light has a property of transmitting silicon, and thus can also be used for inspection of silicon wafers, solar cells, and the like. In addition, in a case where a spectrum from the visible region to the SWIR region can be obtained for an object, advanced analysis will be possible in infrastructure deterioration surveys such as concrete and inspections of agricultural products and soil. From the above description, the imaging lens of the present disclosure capable of corresponding to the wavelength band of the SWIR region has high usefulness.

Next, examples of the imaging lens of the present disclosure will be described. The reference numerals attached to the lenses in the cross-sectional views of each example are used independently for each example in order to avoid complication of description due to an increase in number of digits of the reference numerals. Therefore, even in a case where common reference numerals are attached in the drawings of different examples, components do not necessarily have a common configuration.

Example 1

FIG. 1 shows a cross-sectional view of the configuration of the imaging lens of Example 1, and the illustration method is as described above, and thus, repeated description will be partially omitted. The imaging lens of Example 1 consists of, in order from the object side to the image side, a first lens group G1 that has a positive refractive power, an aperture stop St, and a second lens group G2 that has a positive refractive power. The first lens group G1 consists of lenses L11 to L16 in order from the object side to the image side. The second lens group G2 consists of lenses L21 to L28 in order from the object side to the image side. The outline of the imaging lens according to Example 1 has been described above.

Regarding the imaging lens of Example 1, Table 1 shows basic lens data, and Table 2 shows specifications. In Table 1, the column of the surface number shows a surface number in a case where the object side surface is the first surface and the number increases one by one toward the image side, the column of the curvature radius shows a curvature radius of each surface, the column of the surface spacing shows a surface spacing on the optical axis between each surface and the surface adjacent to the image side, and the column of na shows a refractive index of each component at a wavelength of 1529.58 nm. Further, the columns of ν, θ, and material name respectively indicate ν, θ, and material name of each component. All the materials shown in Table 1 are manufactured by OHARA Corporation. The effective diameter column indicates an effective diameter of each surface.

In Table 1, the sign of the curvature radius of the convex surface facing toward the object side is positive and the sign of the curvature radius of the convex surface facing toward the image side is negative. Further, Table 1 also shows the aperture stop St and the optical member PP, and the surface number and the phrase (St) are noted in the column of the surface number of the surface corresponding to the aperture stop St. In this imaging lens, the luminous flux diameter is also limited on the surface other than the aperture stop St, and in Table 1, # is attached to the right of the surface number of the surface that limits the luminous flux diameter of the marginal ray 3u. A value at the bottom cell of D in Table 1 indicates a distance between the image plane Sim and the surface closest to the image side in the table.

Table 2 shows values of the focal length f, the back focal length Bf at the air conversion distance, the F number FNo, and the maximum total angle of view 2ω. (°) in the cell of 2ω indicates that the unit thereof is a degree. The values shown in Tables 1 and 2 are values in a case where the wavelength of 1529.58 nm is used as a reference in a state where the infinite distance object is in focus.

In the data of each table, degrees are used as a unit of an angle, and millimeters (mm) are used as a unit of a length, but appropriate different units may be used since the optical system can be used even in a case where the system is enlarged or reduced in proportion. Each of the following tables shows numerical values rounded off to predetermined decimal places.

TABLE 1

Example 1
Based on a wavelength of 1529.58 nm

| Surface number | Curvature radius | Surface spacing | na | ν | θ | Material name | Effective diameter |
|---|---|---|---|---|---|---|---|
| 1 | 106.1506 | 4.0100 | 1.58913 | 14.04 | 0.24762 | S-BSM2 | 41.502 |
| 2 | 55.6341 | 6.5950 | 1.60103 | 15.40 | 0.25500 | S-PHM52 | 39.430 |
| 3 | −191.2824 | 0.6477 | | | | | 39.139 |
| 4 | 74.4551 | 2.4043 | 1.76125 | 6.84 | 0.14998 | S-NPH1W | 37.646 |
| 5 | 42.4136 | 6.4786 | 1.43023 | 22.04 | 0.27203 | S-FPL55 | 35.918 |
| 6 | 306.0717 | 0.2334 | | | | | 34.954 |
| 7 | 30.3737 | 8.1345 | 1.80427 | 11.47 | 0.21141 | S-LAH55VS | 33.032 |
| 8 | 58.6543 | 3.2350 | | | | | 29.056 |
| 9 | −580.8142 | 2.9967 | 1.61917 | 12.57 | 0.31107 | S-BSM81 | 27.786 |
| 10 | 19.8385 | 11.4879 | | | | | 23.771 |
| 11(St) | ∞ | 5.5168 | | | | | 23.445 |

TABLE 1-continued

Example 1
Based on a wavelength of 1529.58 nm

| Surface number | Curvature radius | Surface spacing | na | ν | θ | Material name | Effective diameter |
|---|---|---|---|---|---|---|---|
| 12 | −57.9680 | 2.8831 | 1.95440 | 8.89 | 0.14688 | S-LAH99 | 24.358 |
| 13 | −31.4687 | 1.6880 | | | | | 24.875 |
| 14 | −21.6754 | 1.0101 | 1.70504 | 12.51 | 0.27831 | S-LAL18 | 24.809 |
| 15 | −831.1283 | 5.9233 | 1.86834 | 10.26 | 0.16937 | S-LAH93 | 26.961 |
| 16 | −26.2157 | 0.2943 | | | | | 27.800 |
| 17 | −27.8038 | 1.0100 | 1.83681 | 6.26 | 0.13587 | S-NPH4 | 27.613 |
| 18 | 107.5864 | 6.7875 | 1.95440 | 8.89 | 0.14688 | S-LAH99 | 29.679 |
| 19 | −33.9390 | 0.2000 | | | | | 30.411 |
| 20 | 446.7582 | 1.9574 | 1.71784 | 8.23 | 0.15528 | S-TIH4 | 29.241 |
| 21 | −174.3124 | 1.0152 | | | | | 29.024 |
| 22 | 32.1733 | 5.4620 | 1.85023 | 11.40 | 0.19209 | S-LAH58 | 26.882 |
| 23 | −197.4233 | 1.0156 | 1.89131 | 5.43 | 0.12585 | S-NPH3 | 25.467 |
| 24# | 42.9276 | 10.0000 | | | | | 23.476 |
| 25 | ∞ | 1.0000 | 1.50050 | 13.45 | 0.30924 | S-BSL7 | 20.690 |
| 26 | ∞ | 10.3798 | | | | | 20.481 |

TABLE 2

Example 1
Based on a wavelength of 1529.58 nm

| f | 48.32 |
|---|---|
| Bf | 21.04 |
| FNo | 1.20 |
| 2ω(°) | 19.2 |

Figure 13:
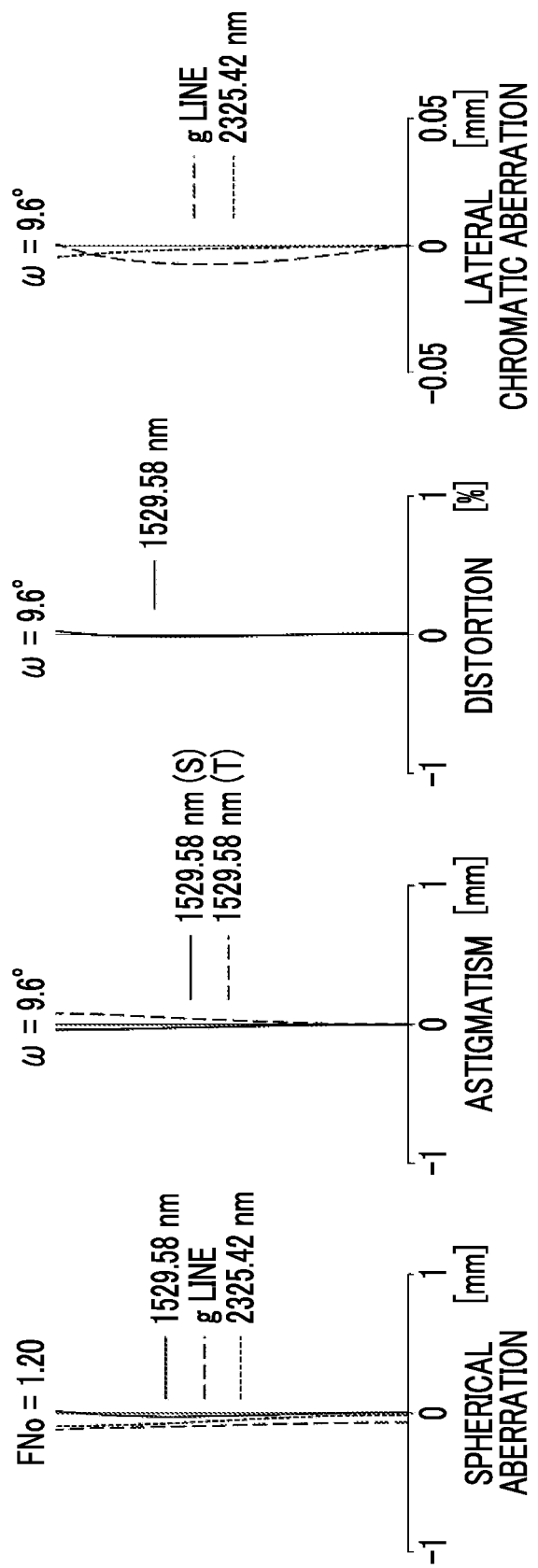
FIG. 13 is a spherical aberration diagram, an astigmatism diagram, a distortion diagram, and a lateral chromatic aberration diagram of the imaging lens according to Example 1 of the present disclosure.
Figure 23:
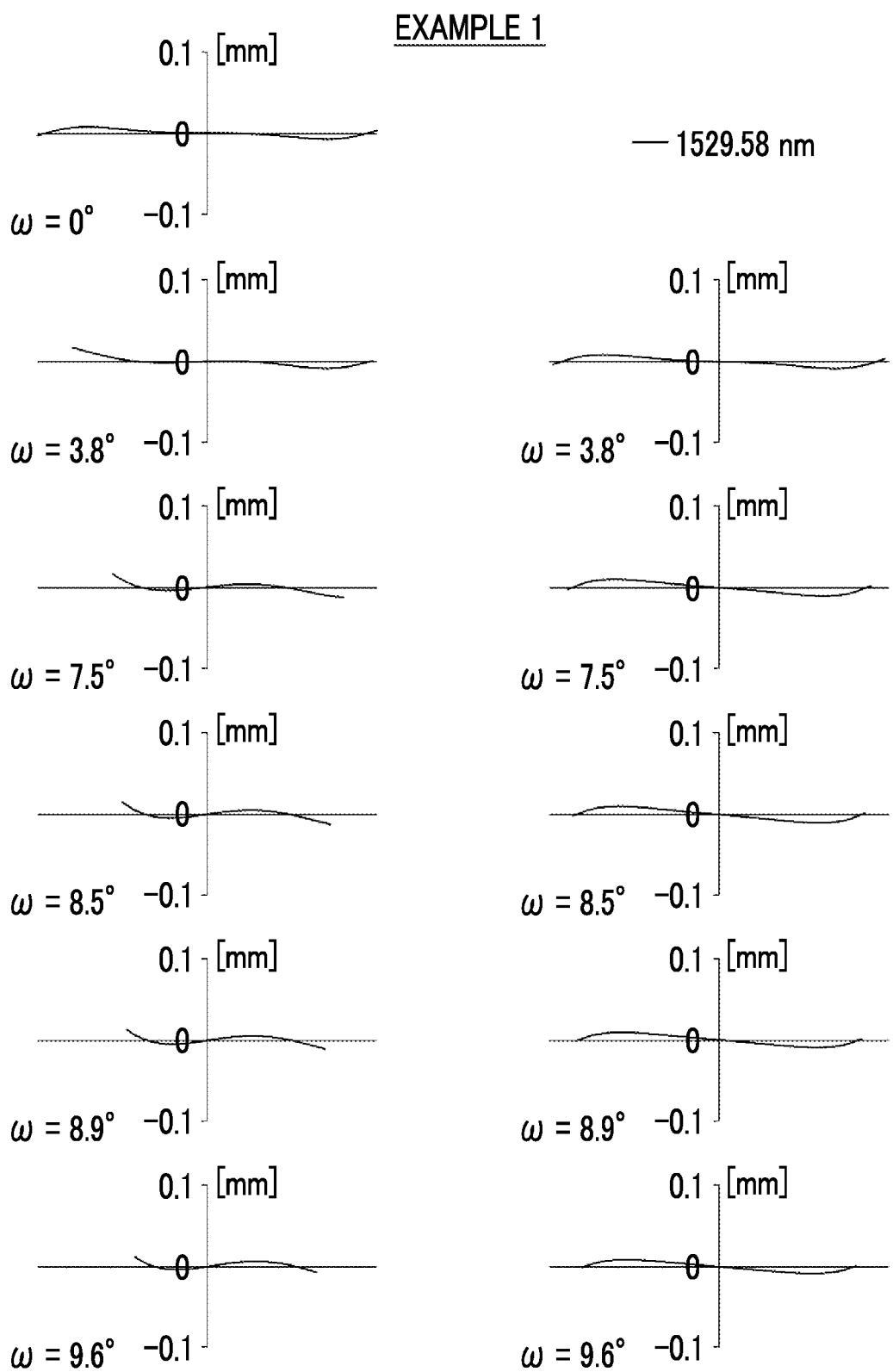
FIG. 23 is a diagram showing lateral aberrations of the imaging lens according to Example 1 of the present disclosure.

FIGS. 13 and 23 show aberration diagrams of the imaging lens according to Example 1 in a state in which the infinite distance object is in focus. FIG. 13 shows spherical aberration, astigmatism, distortion, and lateral chromatic aberration, in order from the left side. In the spherical aberration diagram, aberrations at a wavelength of 1529.58 nm, the g line, and a wavelength of 2325.42 nm are indicated by a solid line, a long broken line, and a short broken line, respectively. In the astigmatism diagram, aberration at the wavelength of 1529.58 nm in the sagittal direction is indicated by a solid line, and aberration at a wavelength of 1529.58 nm in the tangential direction is indicated by a short broken line. In the distortion diagram, aberration at a wavelength of 1529.58 nm is indicated by a solid line. In the lateral chromatic aberration diagram, aberrations at the g line and a wavelength of 2325.42 nm are indicated by a long broken line and a short broken line, respectively. A value of the open F number is noted next to FNo=in spherical aberration diagram, and a value of the maximum half angle of view is noted next to ω=in the other aberration diagrams.

In FIG. 23, for each half angle of view, lateral aberration in the tangential direction is shown in the left column, and lateral aberration in the sagittal direction is shown in the right column A value of each half angle of view is shown next to ω=in the drawing. In FIG. 23, aberration at the wavelength of 1529.58 nm is indicated by a solid line.

Symbols, meanings, description methods, and illustration methods of the respective data pieces according to Example 1 are the same as those in the following examples unless otherwise specified. Therefore, in the following description, repeated description will not be given.

Example 2

Figure 4:
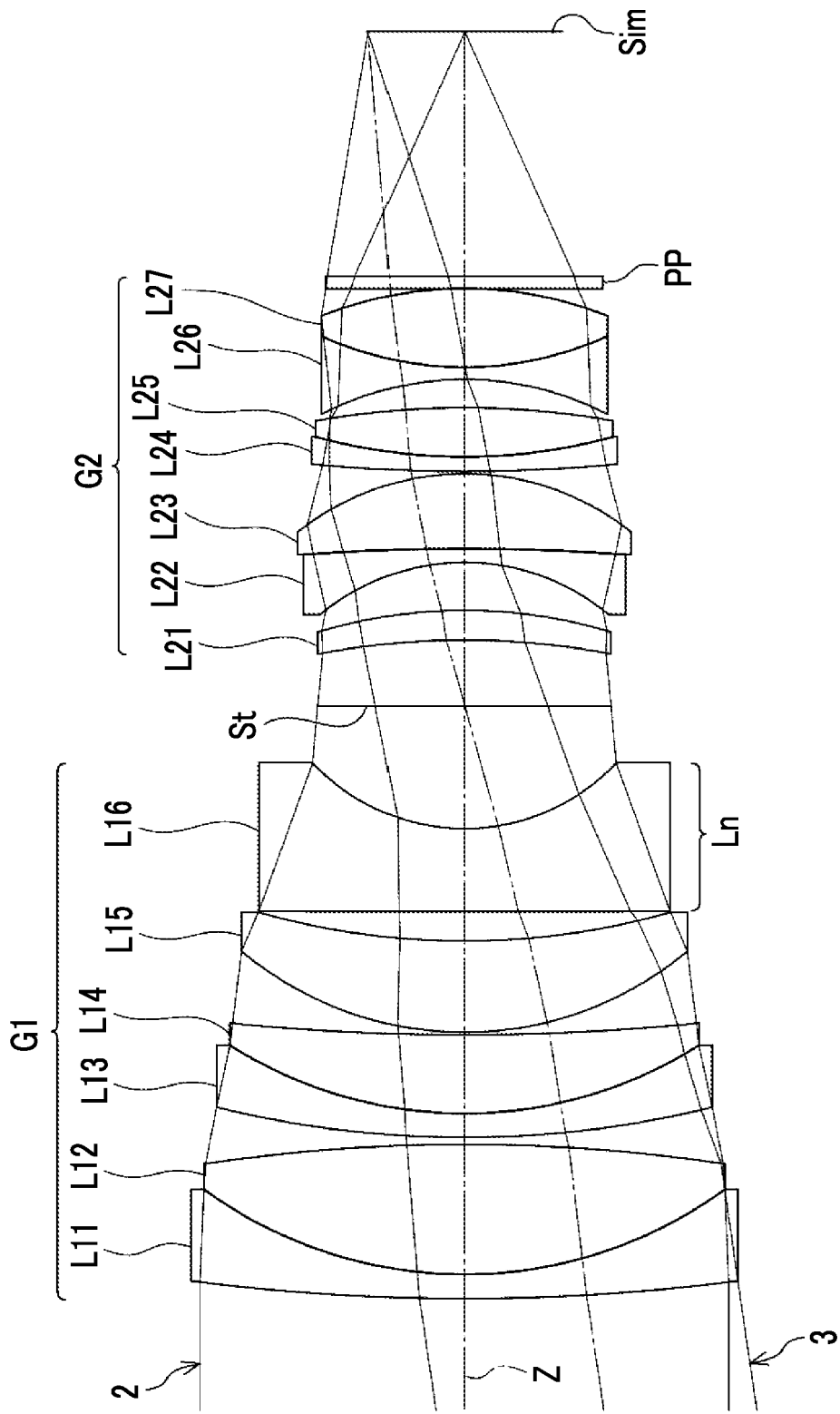
FIG. 4 is a cross-sectional view showing a configuration and luminous flux of an imaging lens according to Example 2 of the present disclosure.
Figure 14:
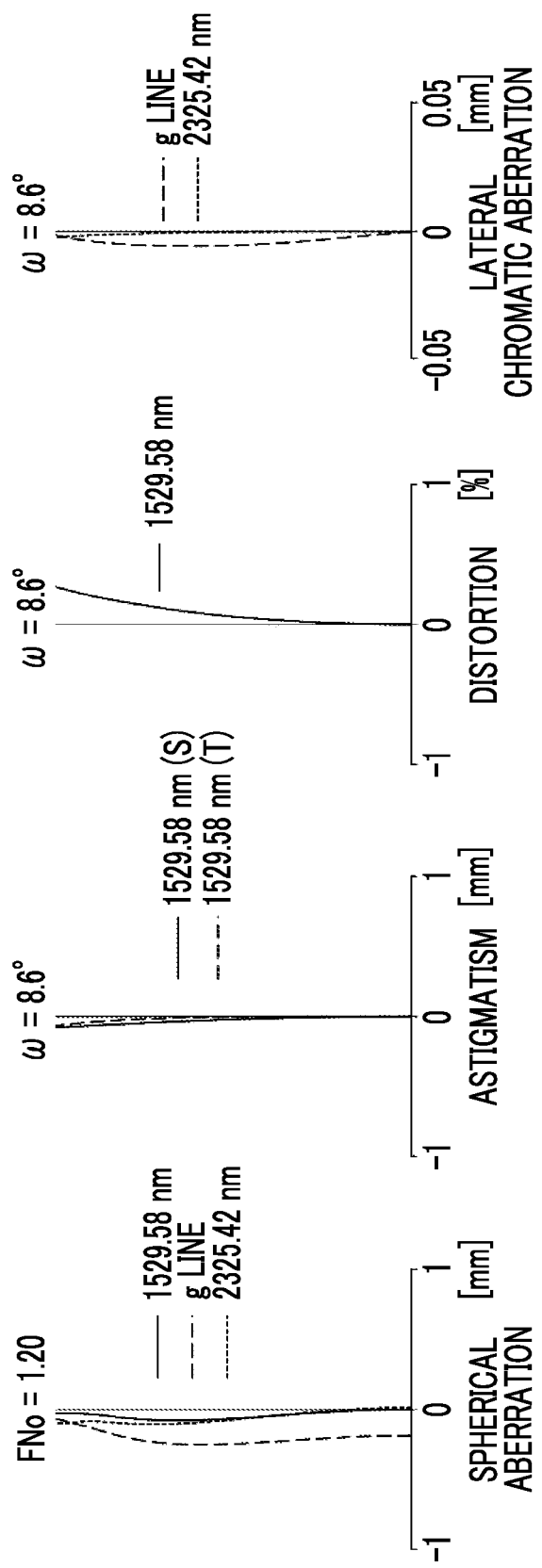
FIG. 14 is a spherical aberration diagram, an astigmatism diagram, a distortion diagram, and a lateral chromatic aberration diagram of the imaging lens according to Example 2 of the present disclosure.
Figure 24:
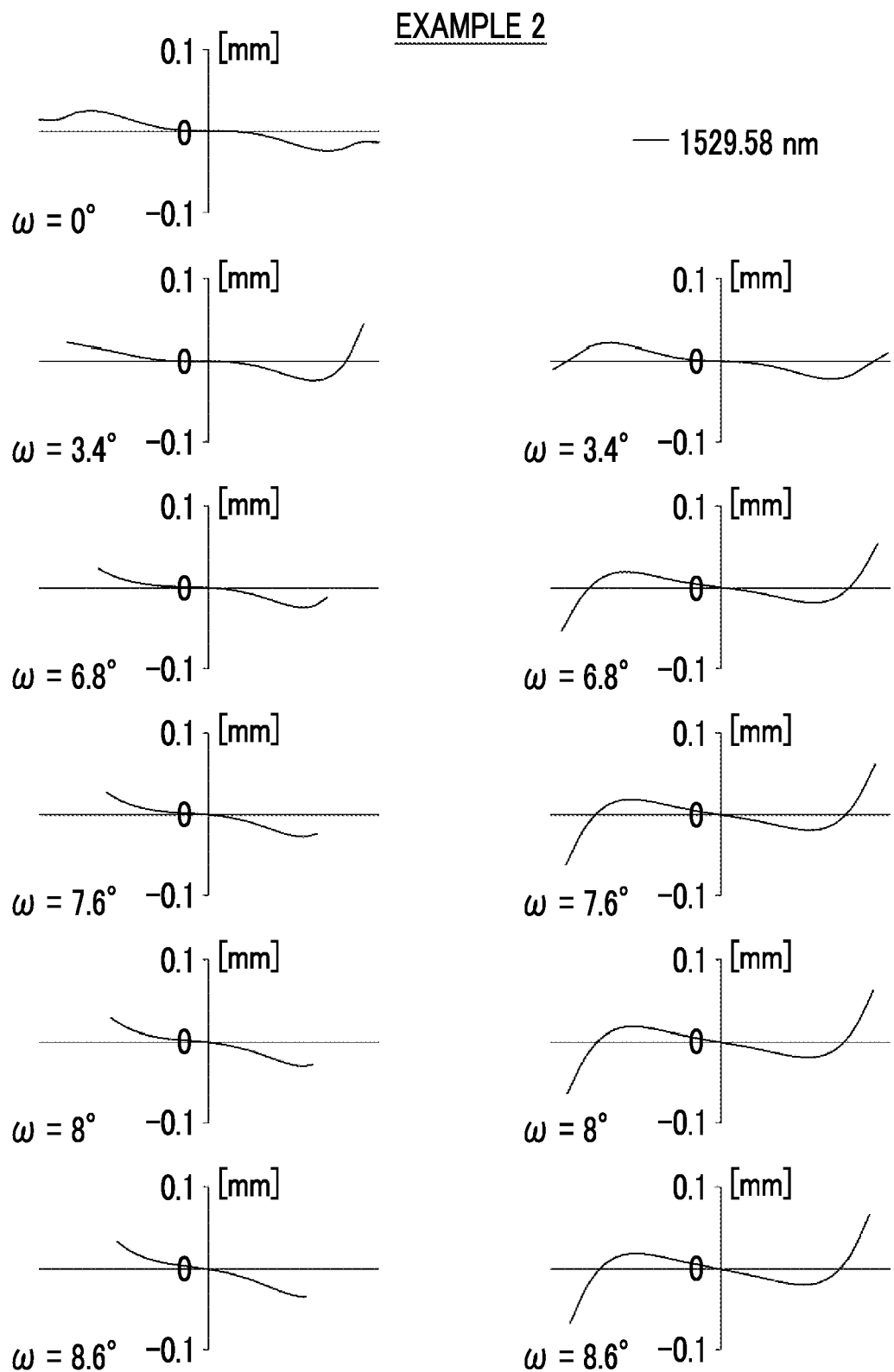
FIG. 24 is a diagram showing lateral aberrations of the imaging lens according to Example 2 of the present disclosure.

FIG. 4 is a cross-sectional view showing a configuration and luminous flux of the imaging lens according to Example 2. The imaging lens according to Example 2 has the same configuration as the outline of the imaging lens according to Example 1 except that the second lens group G2 consists of lenses L21 to L27 in order from the object side to the image side. Regarding the imaging lens according to Example 2, Table 3 shows basic lens data, Table 4 shows specifications, and FIGS. 14 and 24 show aberration diagrams. All the materials shown in Table 3 are manufactured by OHARA Corporation.

TABLE 3

Example 2
Based on a wavelength of 1529.58 nm

| Surface number | Curvature radius | Surface spacing | na | ν | θ | Material name | |
|---|---|---|---|---|---|---|---|
| 1 | 185.5709 | 2.0101 | 1.52370 | 13.91 | 0.26886 | S-BAL12 | 46.549 |
| 2 | 38.1651 | 10.8175 | 1.58634 | 15.21 | 0.27263 | S-PHM53 | 44.293 |
| 3 | −151.3039 | 0.5828 | | | | | 44.007 |
| 4 | 89.4251 | 1.9998 | 1.80944 | 6.90 | 0.14470 | S-NPH5 | 42.132 |
| 5 | 37.8514 | 6.5522 | 1.43023 | 22.04 | 0.27203 | S-FPL55 | 39.876 |
| 6 | 205.4067 | 0.1998 | | | | | 39.440 |
| 7 | 30.0010 | 7.5989 | 1.95440 | 8.89 | 0.14688 | S-LAN99 | 37.881 |
| 8 | 65.1783 | 2.4396 | | | | | 35.039 |
| 9 | 5101.9634 | 6.9215 | 1.50050 | 13.45 | 0.30924 | S-BSL7 | 34.953 |
| 10 | 17.9792 | 10.1094 | | | | | 25.815 |
| 11(St) | ∞ | 5.5090 | | | | | 24.922 |
| 12 | −66.8760 | 2.4652 | 1.85023 | 11.40 | 0.19209 | S-LAH58 | 24.641 |
| 13 | −44.0084 | 3.9946 | | | | | 24.905 |

TABLE 3-continued

Example 2
Based on a wavelength of 1529.58 nm

| Surface number | Curvature radius | Surface spacing | na | ν | θ | Material name | |
|---|---|---|---|---|---|---|---|
| 14 | −19.4647 | 1.1328 | 1.80944 | 6.90 | 0.14470 | S-NPH5 | 27.402 |
| 15 | −196.1721 | 6.2488 | 1.95440 | 8.89 | 0.14688 | S-LAH99 | 27.408 |
| 16 | −23.1308 | 0.1993 | | | | | 28.396 |
| 17 | 140.5487 | 1.2098 | 1.63034 | 12.58 | 0.30166 | S-LAL7Q | 26.018 |
| 18 | 48.7647 | 4.0775 | 1.85686 | 10.69 | 0.17806 | S-LAH92 | 25.273 |
| 19 | −74.6422 | 2.3687 | | | | | 24.788 |
| 20 | −26.7871 | 1.0113 | 1.86146 | 5.84 | 0.13091 | S-NPH2 | 24.225 |
| 21 | 29.6702 | 6.5517 | 1.91082 | 7.44 | 0.13791 | S-TIH57 | 24.343 |
| 22# | −33.4656 | 0.0000 | | | | | 24.333 |
| 23 | ∞ | 1.0000 | 1.50050 | 13.45 | 0.30924 | S-BSL7 | 23.596 |
| 24 | ∞ | 20.3833 | | | | | 23.393 |

TABLE 4

Example 2
Based on a wavelength of 1529.58 nm

| | |
|---|---|
| f | 53.93 |
| Bf | 21.05 |
| FNo | 1.20 |
| 2ω(°) | 17.2 |

Example 3

Figure 5:
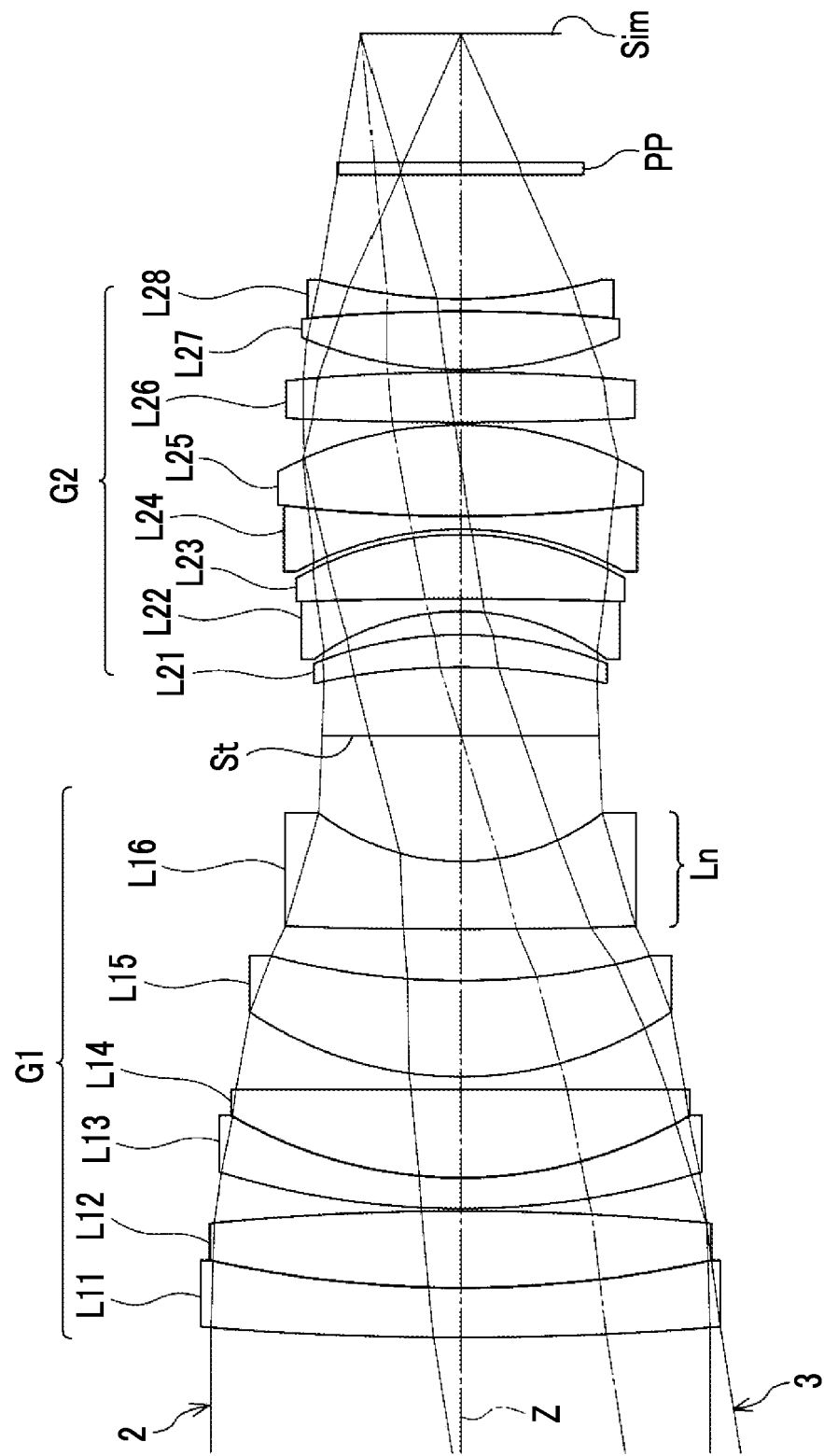
FIG. 5 is a cross-sectional view showing a configuration and luminous flux of an imaging lens according to Example 3 of the present disclosure.
Figure 15:
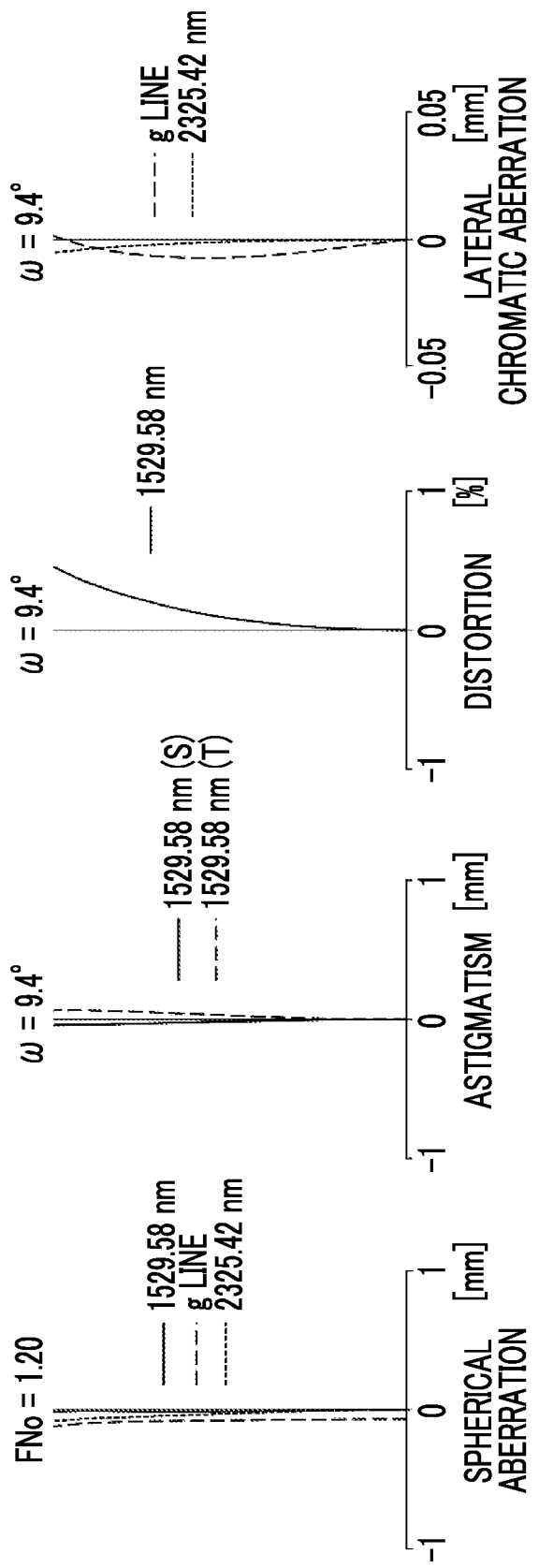
FIG. 15 is a spherical aberration diagram, an astigmatism diagram, a distortion diagram, and a lateral chromatic aberration diagram of the imaging lens according to Example 3 of the present disclosure.
Figure 25:
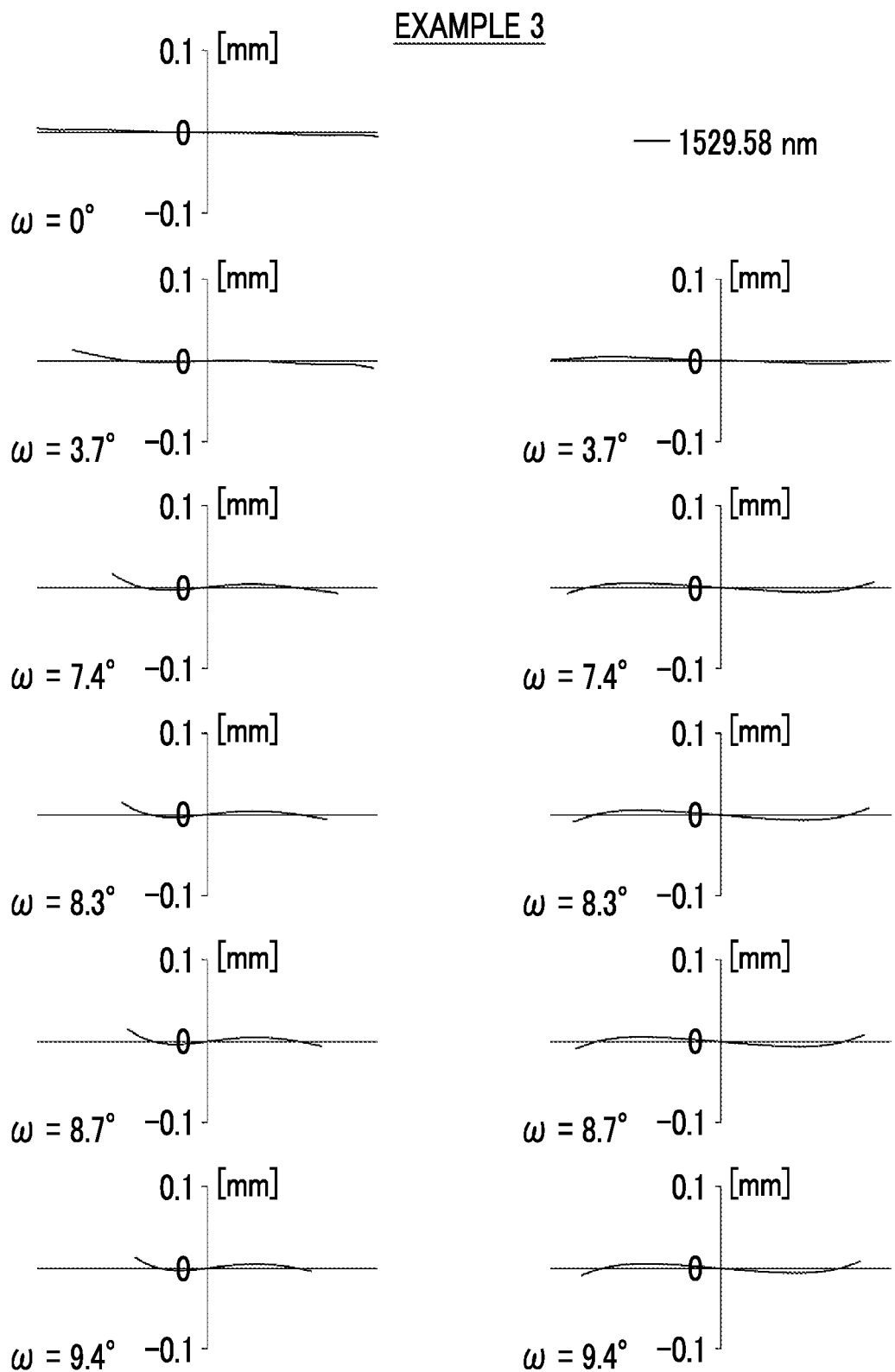
FIG. 25 is a diagram showing lateral aberrations of the imaging lens according to Example 3 of the present disclosure.

FIG. 5 is a cross-sectional view showing a configuration and luminous flux of the imaging lens according to Example 3. The imaging lens according to Example 3 has the same configuration as the outline of the imaging lens according to Example 1. Regarding the imaging lens according to Example 3, Table 5 shows basic lens data, Table 6 shows specifications, and FIGS. 15 and 25 show aberration diagrams. All the materials shown in Table 5 are manufactured by OHARA Corporation.

TABLE 5

Example 3
Based on a wavelength of 1529.58 nm

| Surface number | Curvature radius | Surface spacing | na | ν | θ | Material name | |
|---|---|---|---|---|---|---|---|
| 1 | 267.4158 | 4.0098 | 1.57212 | 10.54 | 0.20955 | S-TIM8 | 42.844 |
| 2 | 96.9875 | 6.1853 | 1.69511 | 12.14 | 0.21984 | S-LAM61 | 41.345 |
| 3 | −216.2094 | 0.2002 | | | | | 41.026 |
| 4 | 68.5204 | 2.4840 | 1.76125 | 6.84 | 0.14998 | S-NPH1W | 39.710 |
| 5 | 38.0481 | 7.1132 | 1.43023 | 22.04 | 0.27203 | S-FPL55 | 37.716 |
| 6 | 6950.6570 | 1.0350 | | | | | 37.117 |
| 7 | 31.4065 | 7.7561 | 1.81983 | 11.31 | 0.19625 | S-LAH89 | 34.675 |
| 8 | 61.8295 | 4.1560 | | | | | 31.175 |
| 9 | 445.7318 | 5.4618 | 1.63034 | 12.58 | 0.30166 | S-LAL7Q | 28.791 |
| 10 | 19.3728 | 10.1033 | | | | | 23.323 |
| 11(St) | ∞ | 5.5021 | | | | | 22.784 |
| 12 | −54.7502 | 2.5926 | 1.91082 | 7.44 | 0.13791 | S-TIH57 | 23.583 |
| 13 | −32.6090 | 1.9031 | | | | | 24.069 |
| 14 | −20.6909 | 1.0102 | 1.67369 | 12.44 | 0.28611 | S-LAL14 | 24.024 |
| 15 | −371.1024 | 5.1737 | 1.86834 | 10.26 | 0.16937 | S-LAH93 | 26.222 |
| 16 | −27.7376 | 0.4235 | | | | | 27.037 |
| 17 | −28.5419 | 1.0617 | 1.83681 | 6.26 | 0.13587 | S-NPH4 | 26.960 |
| 18 | 121.8853 | 7.3743 | 1.95440 | 8.89 | 0.14688 | S-LAH99 | 29.099 |
| 19 | −31.9003 | 0.2002 | | | | | 30.085 |
| 20 | 302.7606 | 4.0438 | 1.85686 | 10.69 | 0.17806 | S-LAH92 | 28.752 |
| 21 | −154.0303 | 0.2000 | | | | | 28.114 |
| 22 | 33.8820 | 4.7190 | 1.85023 | 11.40 | 0.19209 | S-LAH58 | 26.359 |
| 23 | −141.1275 | 1.0002 | 1.89131 | 5.43 | 0.12585 | S-NPH3 | 25.390 |
| 24# | 44.4213 | 10.0000 | | | | | 23.399 |
| 25 | ∞ | 1.0000 | 1.50050 | 13.45 | 0.30924 | S-BSL7 | 20.654 |
| 26 | ∞ | 10.3820 | | | | | 20.448 |

TABLE 6

Example 3
Based on a wavelength of 1529.58 nm

| | |
|---|---|
| f | 49.34 |
| Bf | 21.04 |
| FNo | 1.20 |
| 2ω(°) | 18.8 |

Example 4

Figure 6:
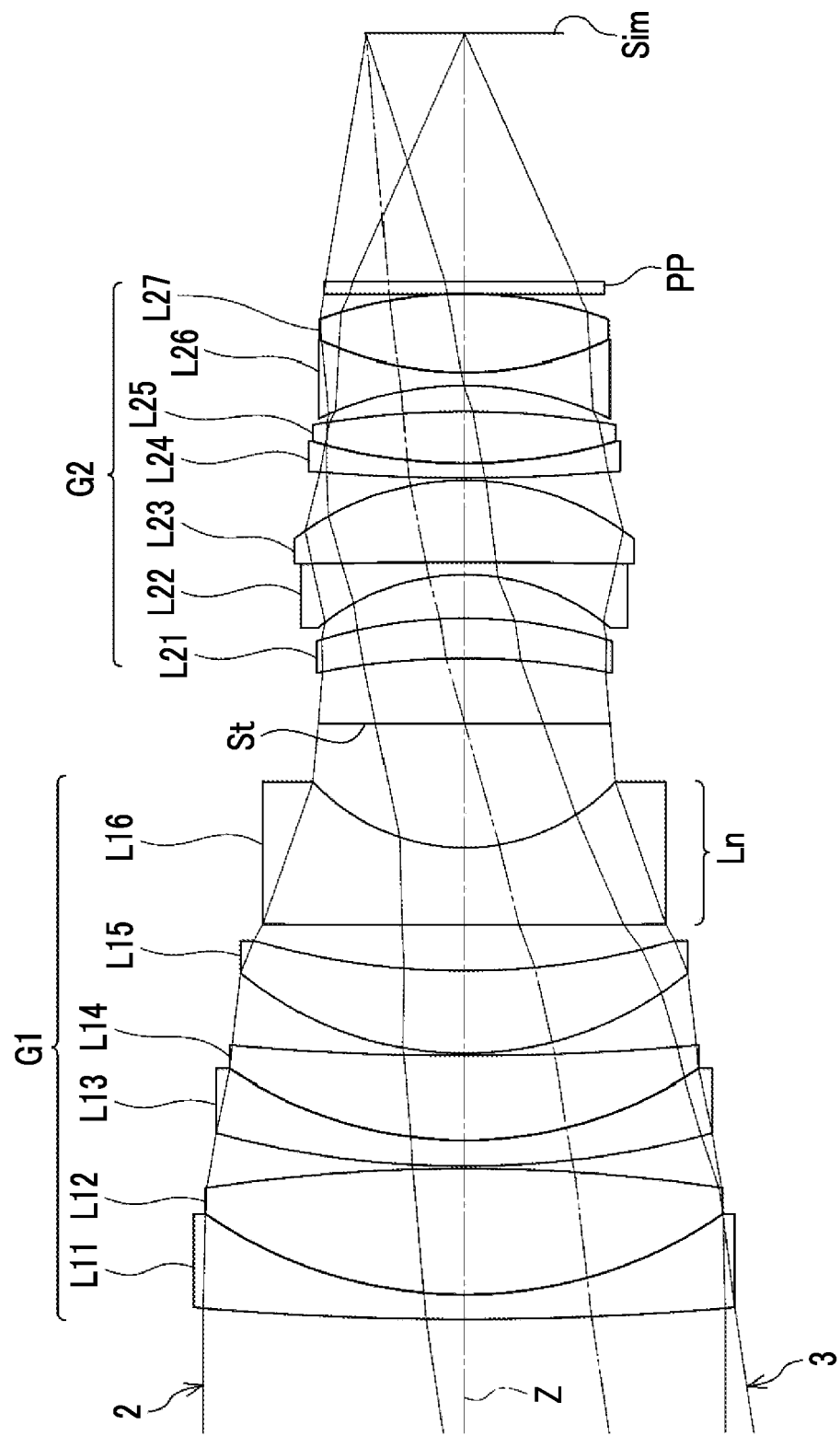
FIG. 6 is a cross-sectional view showing the configuration and luminous flux of the imaging lens according to Example 4 of the present disclosure.
Figure 16:
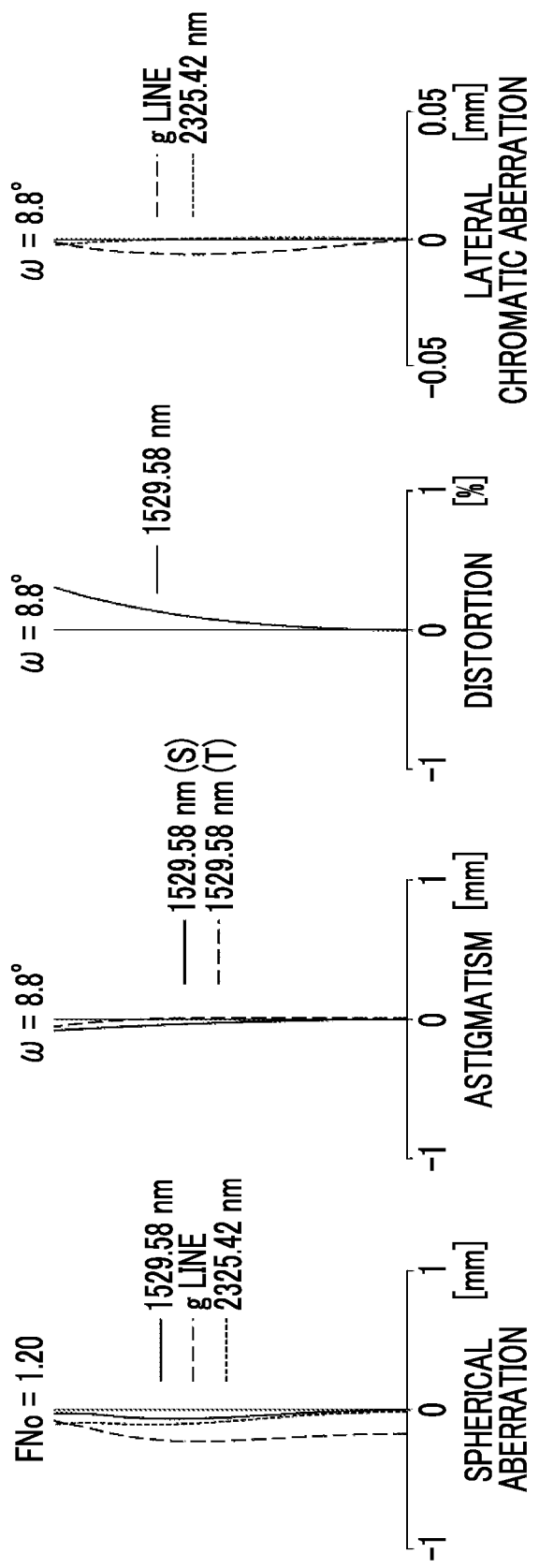
FIG. 16 is a spherical aberration diagram, an astigmatism diagram, a distortion diagram, and a lateral chromatic aberration diagram of the imaging lens according to Example 4 of the present disclosure.
Figure 26:
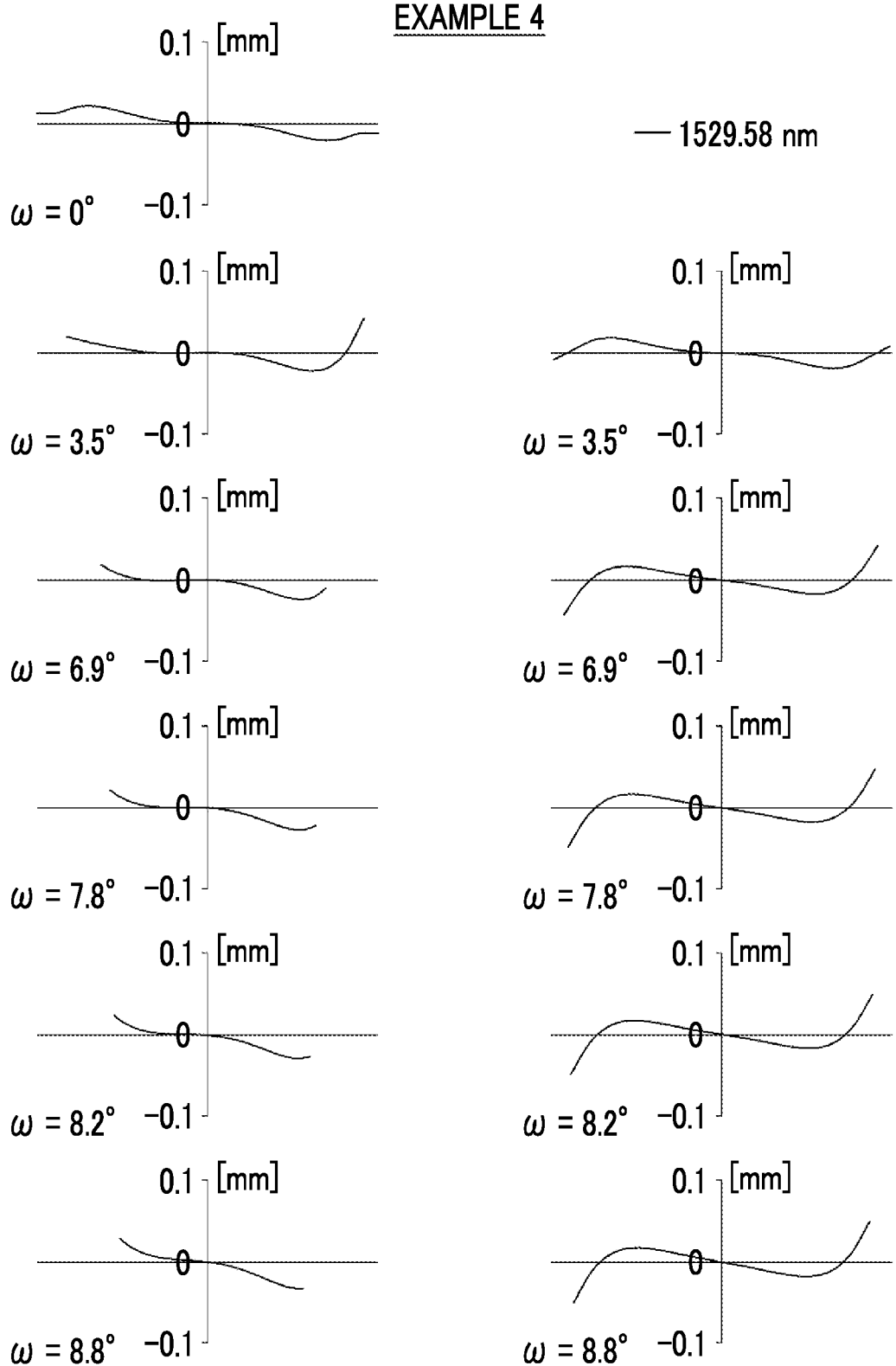
FIG. 26 is a diagram showing lateral aberrations of the imaging lens according to Example 4 of the present disclosure.

FIG. 6 is a cross-sectional view showing a configuration and luminous flux of the imaging lens according to Example 4. The imaging lens according to Example 4 has the same configuration as the outline of the imaging lens according to Example 1 except that the second lens group G2 consists of lenses L21 to L27 in order from the object side to the image side. Regarding the imaging lens according to Example 4, Table 7 shows basic lens data, Table 8 shows specifications, and FIGS. 16 and 26 show aberration diagrams. All the materials shown in Table 7 are manufactured by OHARA Corporation.

TABLE 7

Example 4
Based on a wavelength of 1529.58 nm

| Surface number | Curvature radius | Surface spacing | na | ν | θ | Material name | Effective diameter |
|---|---|---|---|---|---|---|---|
| 1 | 270.3490 | 2.0100 | 1.52370 | 13.91 | 0.26886 | S-BAL12 | 45.452 |
| 2 | 38.8744 | 10.3441 | 1.58634 | 15.21 | 0.27263 | S-PHM53 | 43.369 |
| 3 | −147.6457 | 0.2000 | | | | | 43.142 |
| 4 | 81.0826 | 2.1267 | 1.80944 | 6.90 | 0.14470 | S-NPH5 | 41.573 |
| 5 | 36.0488 | 6.8653 | 1.43023 | 22.04 | 0.27203 | S-FPL55 | 39.316 |
| 6 | 220.0752 | 0.1999 | | | | | 38.907 |
| 7 | 30.0273 | 6.7689 | 1.95440 | 8.89 | 0.14688 | S-LAH99 | 37.524 |
| 8 | 64.1176 | 3.7632 | | | | | 35.273 |
| 9 | 2370.2925 | 6.3401 | 1.47324 | 14.05 | 0.32562 | S-FSL5 | 33.735 |
| 10 | 17.5424 | 10.2024 | | | | | 25.333 |
| 11(St) | ∞ | 5.3419 | | | | | 24.458 |
| 12 | −64.4908 | 3.2780 | 1.85023 | 11.40 | 0.19209 | S-LAH58 | 24.290 |
| 13 | −41.7116 | 3.5858 | | | | | 24.687 |
| 14 | −19.3506 | 1.0263 | 1.80944 | 6.90 | 0.14470 | S-NPH5 | 24.414 |
| 15 | −659.9838 | 6.7129 | 1.95440 | 8.89 | 0.14688 | S-LAH99 | 27.347 |
| 16 | −23.4469 | 0.2000 | | | | | 28.420 |
| 17 | 151.5339 | 1.2100 | 1.63034 | 12.58 | 0.30166 | S-LAL7Q | 26.123 |
| 18 | 46.1109 | 4.2413 | 1.85686 | 10.69 | 0.17806 | S-LAH92 | 25.366 |
| 19 | −73.0902 | 2.1298 | | | | | 24.886 |
| 20 | −28.5657 | 1.0648 | 1.86146 | 5.84 | 0.13091 | S-NPH2 | 24.378 |
| 21 | 29.1312 | 6.3887 | 1.91082 | 7.44 | 0.13791 | S-TIH57 | 24.277 |
| 22# | −36.1394 | 0.0000 | | | | | 24.213 |
| 23 | ∞ | 1.0000 | 1.50050 | 13.45 | 0.30924 | S-BSL7 | 23.542 |
| 24 | ∞ | 20.3771 | | | | | 23.340 |

TABLE 8

Example 4
Based on a wavelength of 1529.58 nm

| | |
|---|---|
| f | 52.59 |
| Bf | 21.04 |
| FNo | 1.20 |
| 2ω(°) | 17.6 |

Example 5

Figure 7:
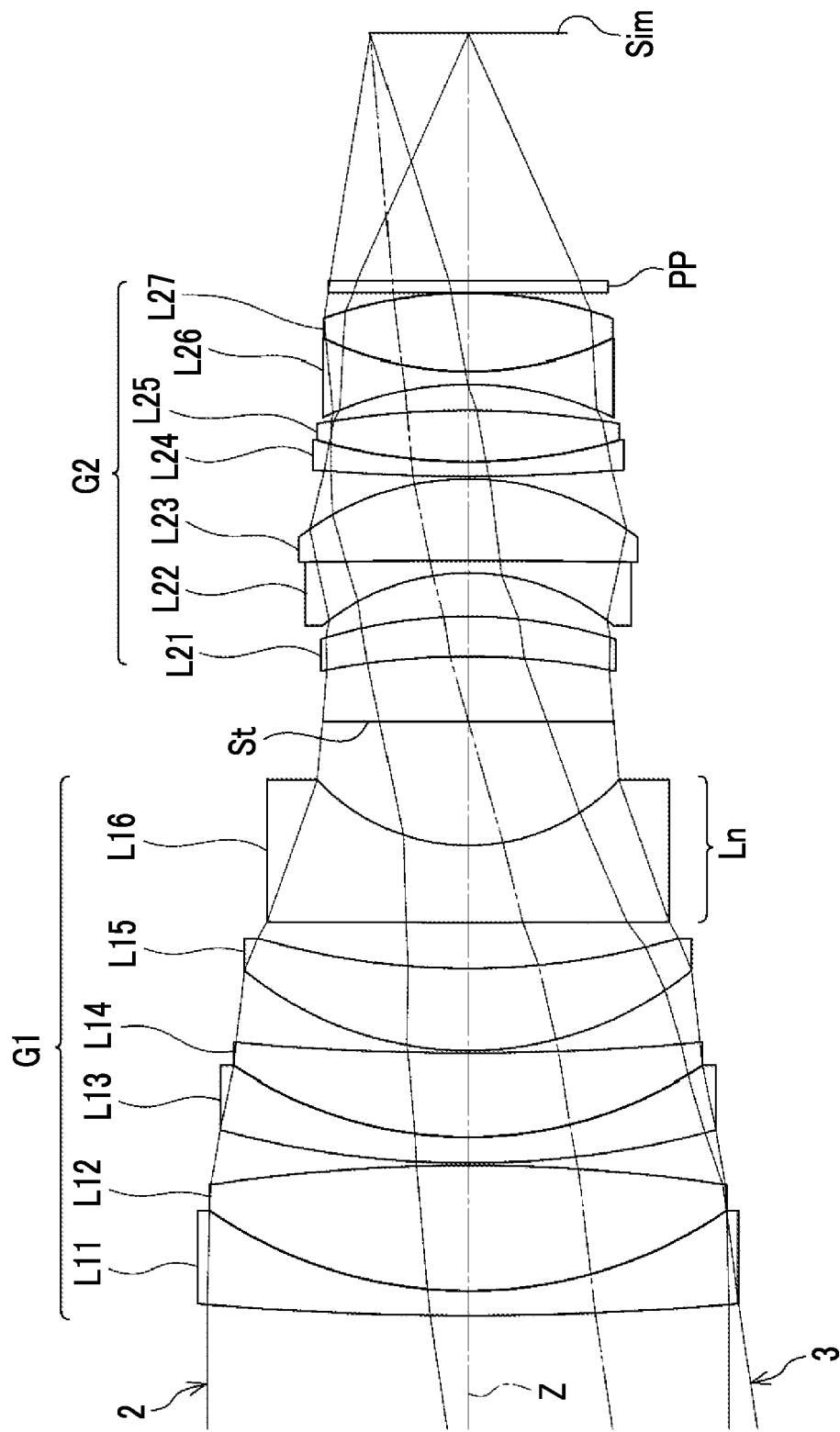
FIG. 7 is a cross-sectional view showing the configuration and luminous flux of the imaging lens according to Example 5 of the present disclosure.
Figure 17:
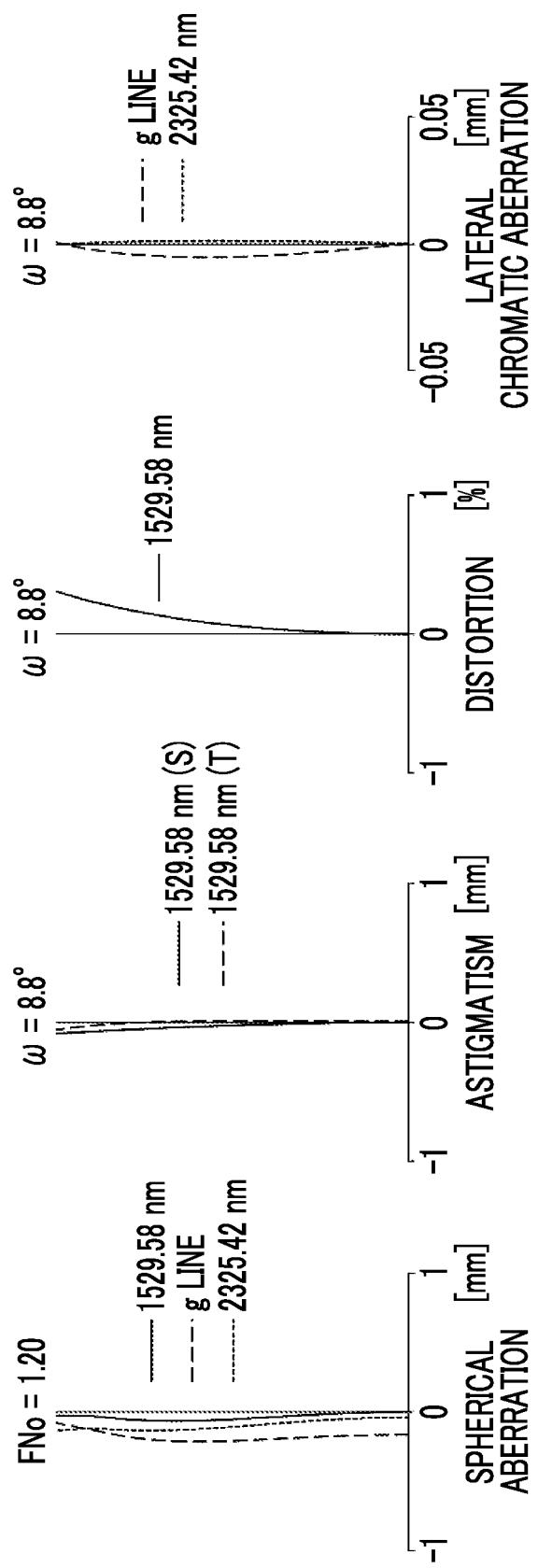
FIG. 17 is a spherical aberration diagram, an astigmatism diagram, a distortion diagram, and a lateral chromatic aberration diagram of the imaging lens according to Example 5 of the present disclosure.
Figure 27:
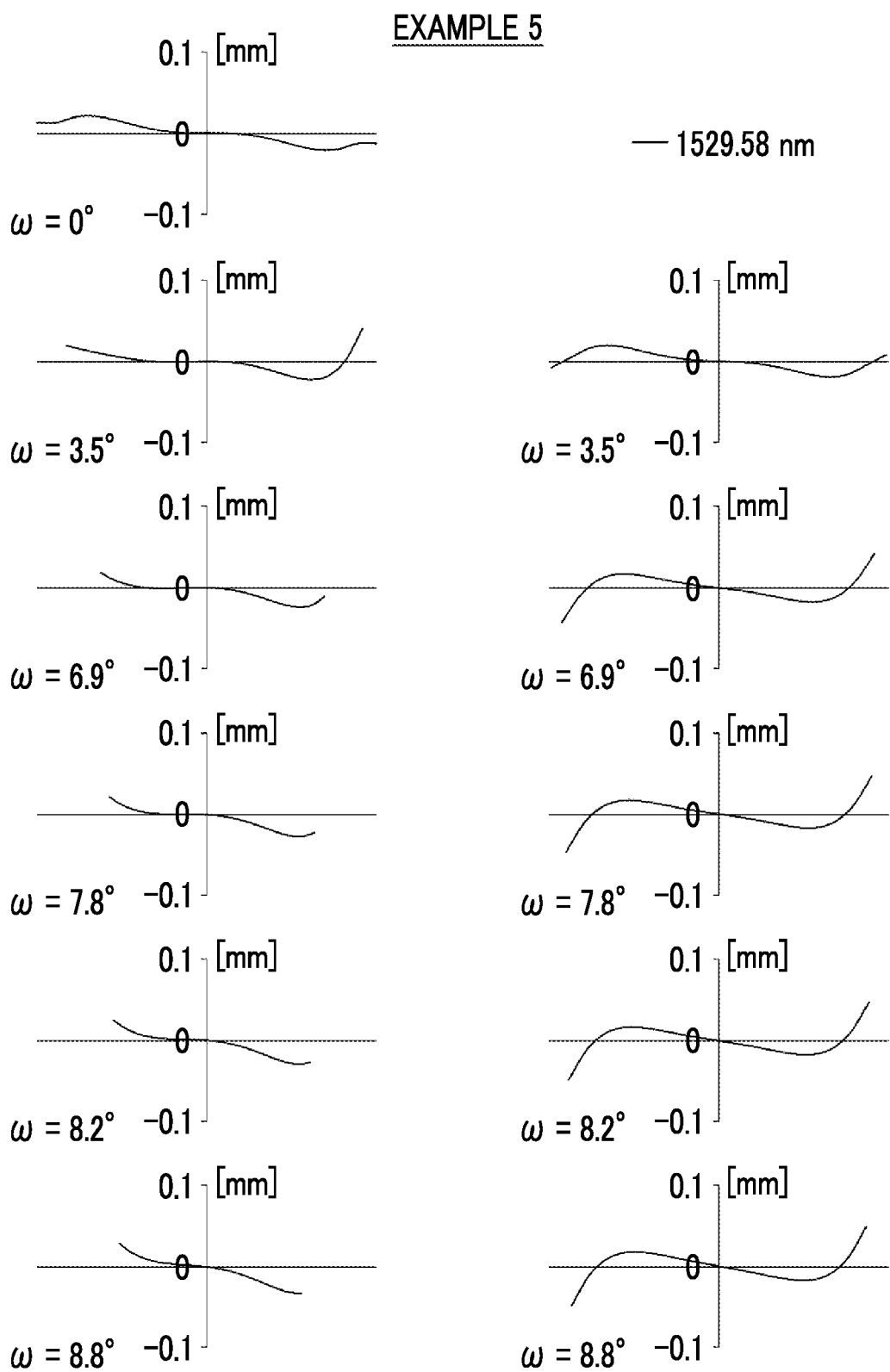
FIG. 27 is a diagram showing lateral aberrations of the imaging lens according to Example 5 of the present disclosure.

FIG. 7 is a cross-sectional view showing a configuration and luminous flux of the imaging lens according to Example 5. The imaging lens according to Example 5 has the same configuration as the outline of the imaging lens according to Example 1 except that the second lens group G2 consists of lenses L21 to L27 in order from the object side to the image side. Regarding the imaging lens according to Example 5, Table 9 shows basic lens data, Table 10 shows specifications, and FIGS. 17 and 27 show aberration diagrams. Among the materials shown in Table 9, the material on the ninth surface is manufactured by Schott Corporation, and the others are all manufactured by OHARA Corporation.

TABLE 9

Example 5
Based on a wavelength of 1529.58 nm

| Surface number | Curvature radius | Surface spacing | na | ν | θ | Material name | Effective diameter |
|---|---|---|---|---|---|---|---|
| 1 | 269.3089 | 2.0101 | 1.52370 | 13.91 | 0.26886 | S-BAL12 | 45.497 |
| 2 | 38.9661 | 10.3316 | 1.58634 | 15.21 | 0.27263 | S-PHM53 | 43.416 |
| 3 | −147.7264 | 0.2002 | | | | | 43.190 |
| 4 | 81.0015 | 2.1322 | 1.80944 | 6.90 | 0.14470 | S-NPH5 | 41.615 |
| 5 | 36.0627 | 6.8445 | 1.43023 | 22.04 | 0.27203 | S-FPL55 | 39.351 |
| 6 | 217.4355 | 0.1999 | | | | | 38.945 |
| 7 | 30.0221 | 6.7630 | 1.95440 | 8.89 | 0.14688 | S-LAH99 | 37.561 |
| 8 | 64.0848 | 3.7805 | | | | | 35.320 |
| 9 | 2176.0024 | 6.3366 | 1.47312 | 13.87 | 0.33148 | N-FK5 | 33.762 |
| 10 | 17.5416 | 10.2176 | | | | | 25.345 |
| 11(St) | ∞ | 5.3435 | | | | | 24.463 |
| 12 | −64.5722 | 3.2846 | 1.85023 | 11.40 | 0.19209 | S-LAH58 | 24.290 |
| 13 | −41.7767 | 3.5854 | | | | | 24.686 |
| 14 | −19.3521 | 1.0283 | 1.80944 | 6.90 | 0.14470 | S-NPH5 | 24.413 |
| 15 | −668.2162 | 6.7113 | 1.95440 | 8.89 | 0.14688 | S-LAH99 | 27.346 |
| 16 | −23.4469 | 0.1998 | | | | | 28.417 |
| 17 | 151.2983 | 1.2101 | 1.63034 | 12.58 | 0.30166 | S-LAL7Q | 26.119 |
| 18 | 46.2363 | 4.2341 | 1.85686 | 10.69 | 0.17806 | S-LAH92 | 25.362 |
| 19 | −73.1138 | 2.1243 | | | | | 24.882 |
| 20 | −28.5625 | 1.0660 | 1.86146 | 5.84 | 0.13091 | S-NPH2 | 24.382 |
| 21 | 29.0507 | 6.3960 | 1.91082 | 7.44 | 0.13791 | S-TIH57 | 24.280 |
| 22# | −36.1505 | 0.0000 | | | | | 24.215 |
| 23 | ∞ | 1.0000 | 1.50050 | 13.45 | 0.30924 | S-BSL7 | 23.544 |
| 24 | ∞ | 20.3737 | | | | | 23.342 |

TABLE 10

Example 5
Based on a wavelength of 1529.58 nm

| | |
|---|---|
| f | 52.65 |
| Bf | 21.04 |
| FNo | 1.20 |
| 2ω(°) | 17.6 |

Example 6

Figure 8:
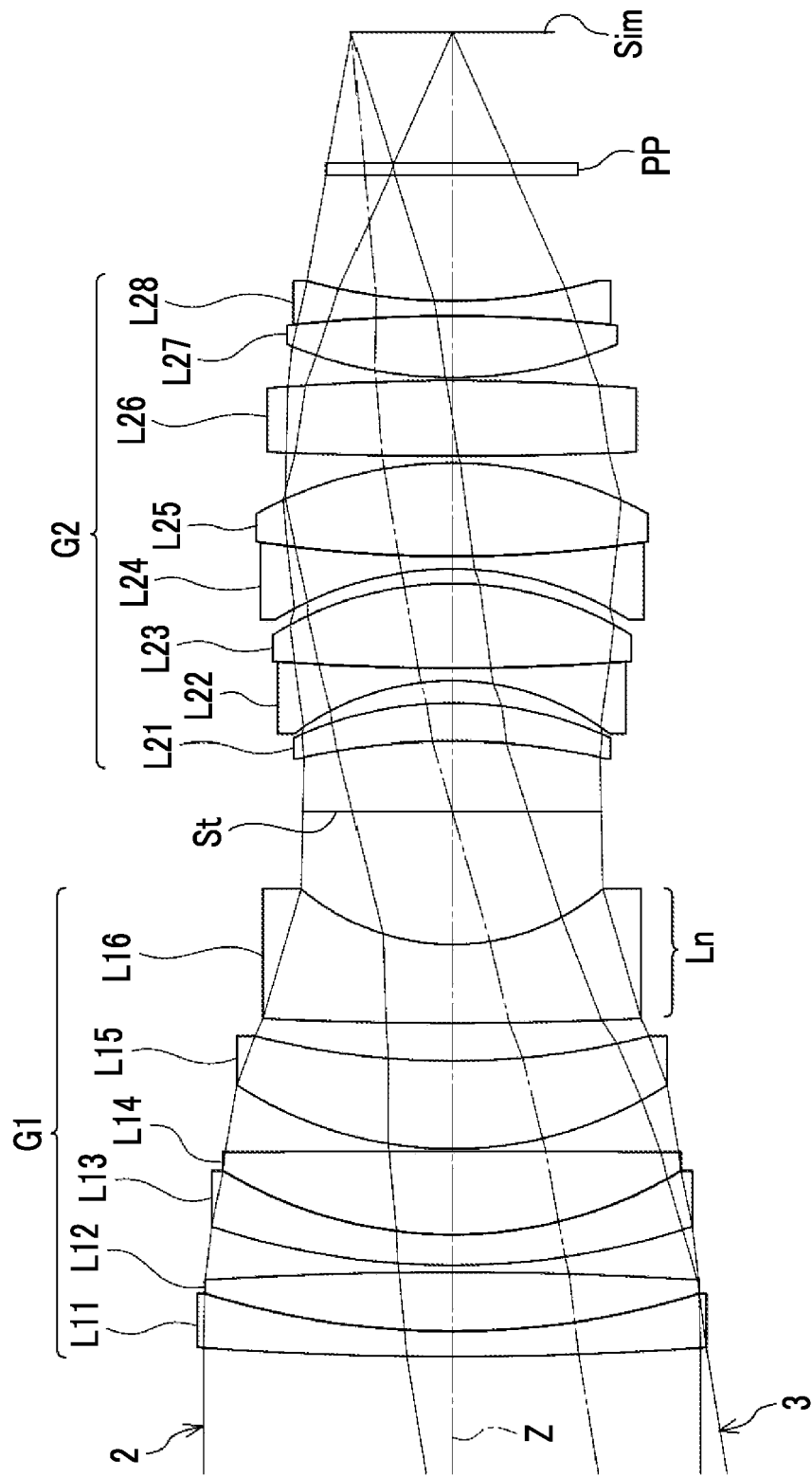
FIG. 8 is a cross-sectional view showing the configuration and luminous flux of the imaging lens according to Example 6 of the present disclosure.
Figure 18:
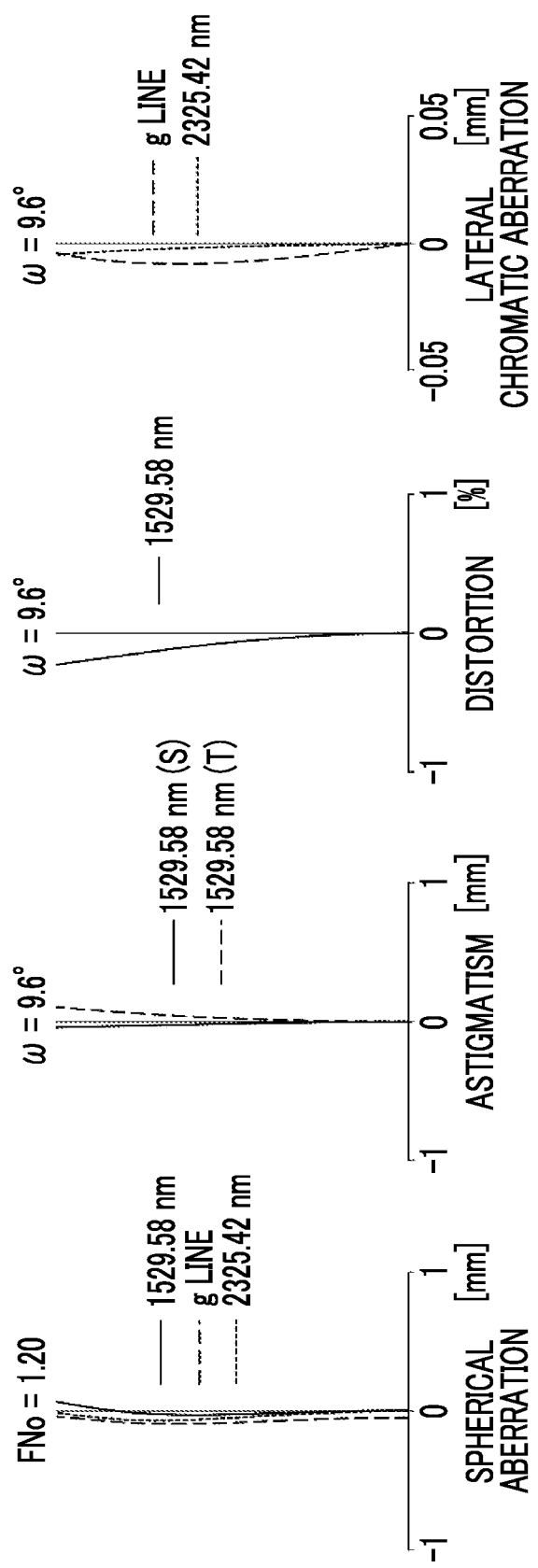
FIG. 18 is a spherical aberration diagram, an astigmatism diagram, a distortion diagram, and a lateral chromatic aberration diagram of the imaging lens according to Example 6 of the present disclosure.
Figure 28:
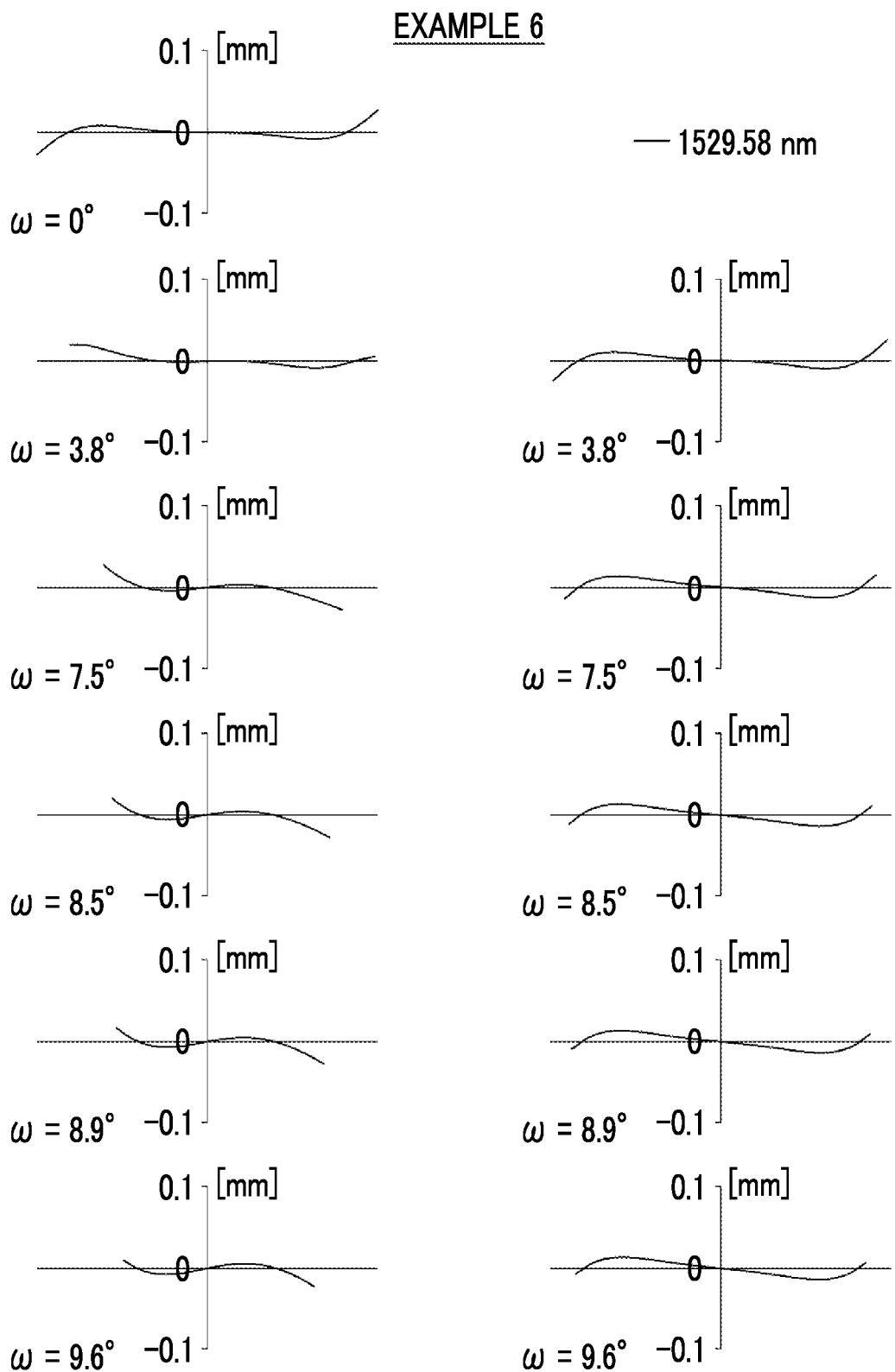
FIG. 28 is a diagram showing lateral aberrations of the imaging lens according to Example 6 of the present disclosure.

FIG. 8 is a cross-sectional view showing a configuration and luminous flux of the imaging lens according to Example 6. The imaging lens according to Example 6 has the same configuration as the outline of the imaging lens according to Example 1. Regarding the imaging lens according to Example 6, Table 11 shows basic lens data, Table 12 shows specifications, and FIGS. 18 and 28 show aberration diagrams. All the materials shown in Table 11 are manufactured by OHARA Corporation.

TABLE 11

Example 6
Based on a wavelength of 1529.58 nm

| Surface number | Curvature radius | Surface spacing | na | ν | θ | Material name | Effective diameter |
|---|---|---|---|---|---|---|---|
| 1 | 290.8286 | 2.0101 | 1.57212 | 10.54 | 0.20955 | S-TIM8 | 41.438 |
| 2 | 68.6602 | 4.6954 | 1.69511 | 12.14 | 0.21984 | S-LAM61 | 40.249 |
| 3 | −331.6784 | 0.5709 | | | | | 40.151 |
| 4 | 63.7358 | 2.4361 | 1.76125 | 6.84 | 0.14998 | S-NPH1W | 39.125 |
| 5 | 36.7105 | 6.6231 | 1.43023 | 22.04 | 0.27203 | S-FPL55 | 37.288 |
| 6 | −3472.2879 | 0.2002 | | | | | 36.922 |
| 7 | 32.6242 | 7.0172 | 1.81983 | 11.31 | 0.19625 | S-LAH89 | 34.995 |
| 8 | 66.2616 | 3.0249 | | | | | 32.087 |
| 9 | 364.9561 | 6.2426 | 1.60168 | 13.81 | 0.27788 | S-BSM16 | 30.757 |
| 10 | 19.2337 | 10.5817 | | | | | 24.534 |
| 11(St) | ∞ | 5.5844 | | | | | 24.294 |
| 12 | −58.1014 | 2.9999 | 1.91082 | 7.44 | 0.13791 | S-T1H57 | 25.229 |
| 13 | −31.0788 | 1.7696 | | | | | 25.751 |
| 14 | −21.5786 | 1.0100 | 1.67369 | 12.44 | 0.28611 | S-LAL14 | 25.689 |
| 15 | 200.6748 | 6.7292 | 1.86834 | 10.26 | 0.16937 | S-LAH93 | 28.331 |
| 16 | −28.0109 | 1.1513 | | | | | 29.170 |
| 17 | −27.6374 | 1.0100 | 1.83681 | 6.26 | 0.13587 | S-NPH4 | 28.792 |
| 18 | 108.5559 | 7.4451 | 1.95440 | 8.89 | 0.14688 | S-LAH99 | 31.144 |
| 19 | −33.3515 | 0.5464 | | | | | 31.907 |
| 20 | 358.4160 | 5.9970 | 1.85686 | 10.69 | 0.17806 | S-LAH92 | 30.234 |
| 21 | −191.0296 | 0.2525 | | | | | 29.131 |

TABLE 11-continued

Example 6
Based on a wavelength of 1529.58 nm

| Surface number | Curvature radius | Surface spacing | na | ν | θ | Material name | Effective diameter |
|---|---|---|---|---|---|---|---|
| 22 | 35.4237 | 4.9078 | 1.85023 | 11.40 | 0.19209 | S-LAH58 | 27.187 |
| 23 | −119.1765 | 1.1956 | 1.89131 | 5.43 | 0.12585 | S-NPH3 | 26.185 |
| 24# | 44.0991 | 10.0000 | | | | | 23.852 |
| 25 | ∞ | 1.0000 | 1.50050 | 13.45 | 0.30924 | S-BSL7 | 20.890 |
| 26 | ∞ | 10.3807 | | | | | 20.668 |

TABLE 12

Example 6
Based on a wavelength of 1529.58 nm

| f | 48.54 |
|---|---|
| Bf | 21.04 |
| FNo | 1.20 |
| 2ω(°) | 19.2 |

TABLE 14

Example 7
Based on a wavelength of 1529.58 nm

| f | 49.16 |
|---|---|
| Bf | 21.04 |
| FNo | 1.20 |
| 2ω(°) | 18.8 |

Example 7

Figure 9:
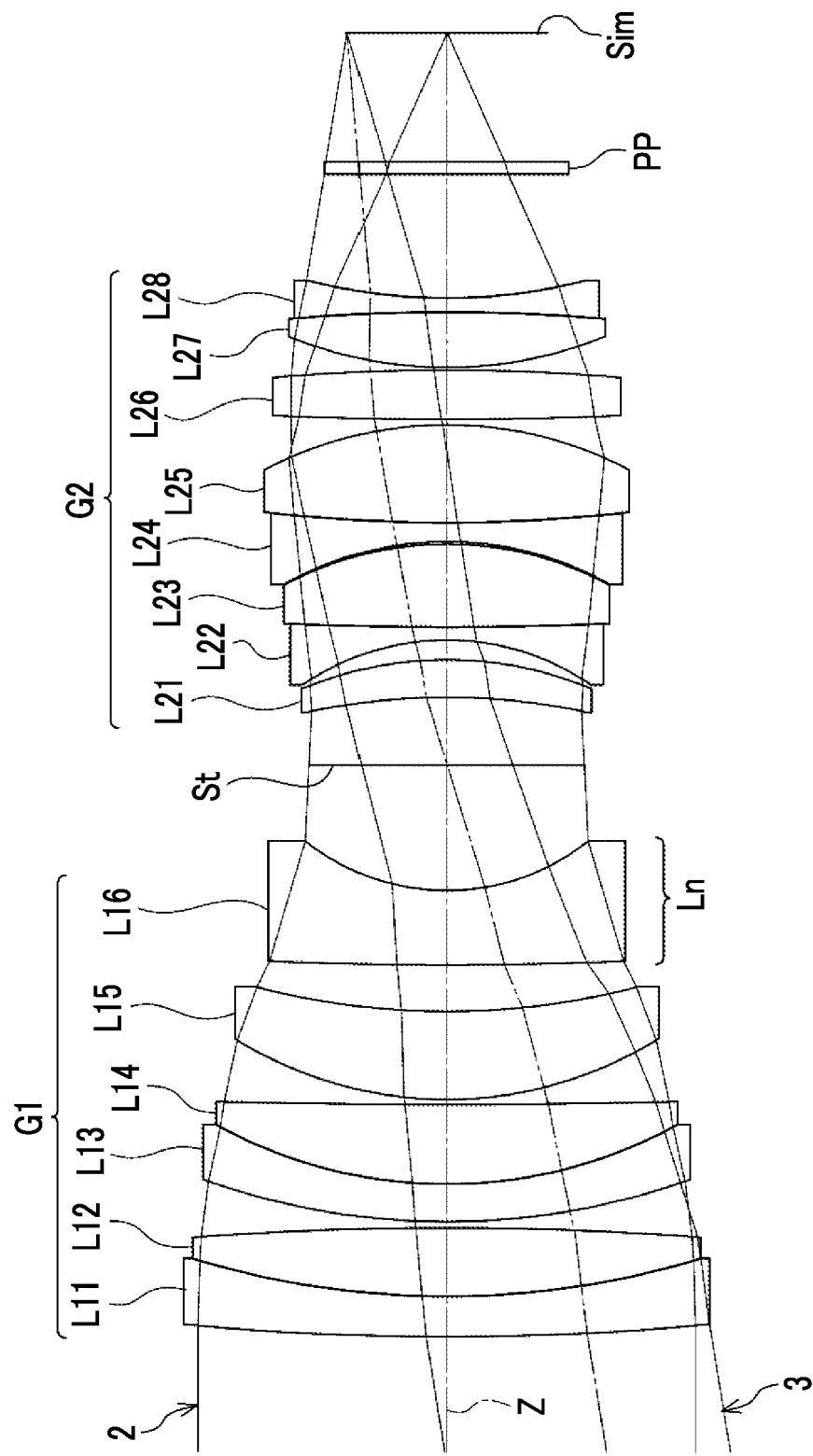
FIG. 9 is a cross-sectional view showing the configuration and luminous flux of the imaging lens according to Example 7 of the present disclosure.
Figure 19:
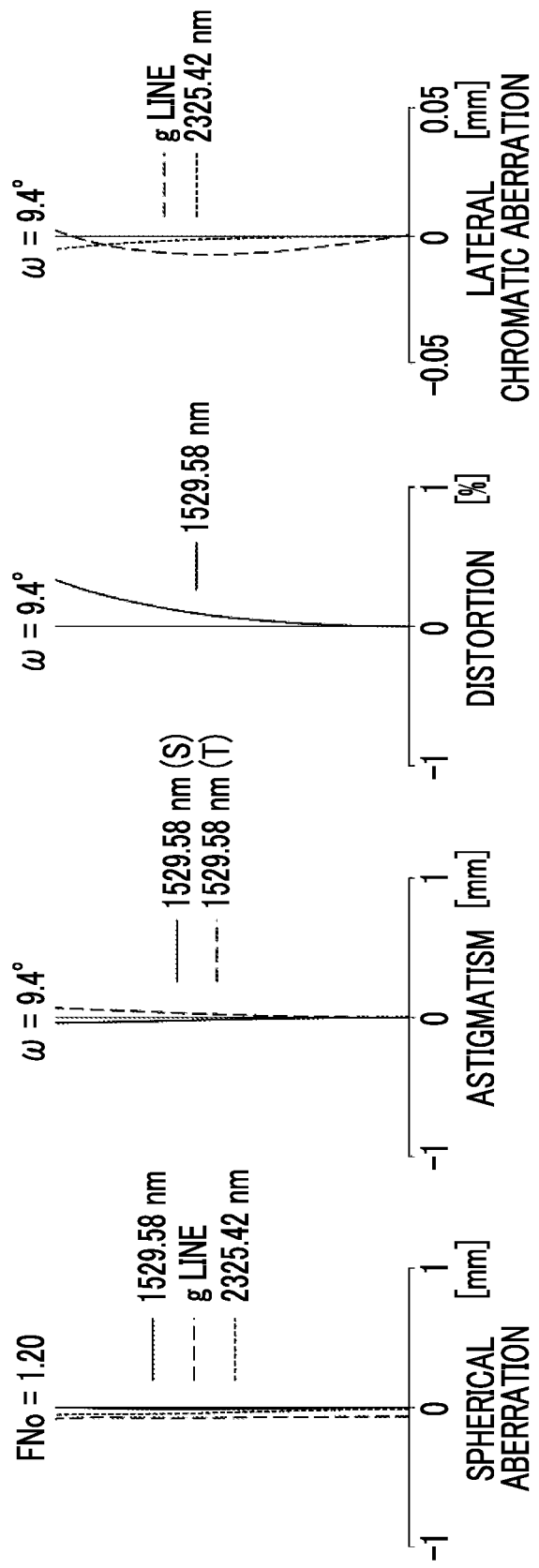
FIG. 19 is a spherical aberration diagram, an astigmatism diagram, a distortion diagram, and a lateral chromatic aberration diagram of the imaging lens according to Example 7 of the present disclosure.
Figure 29:
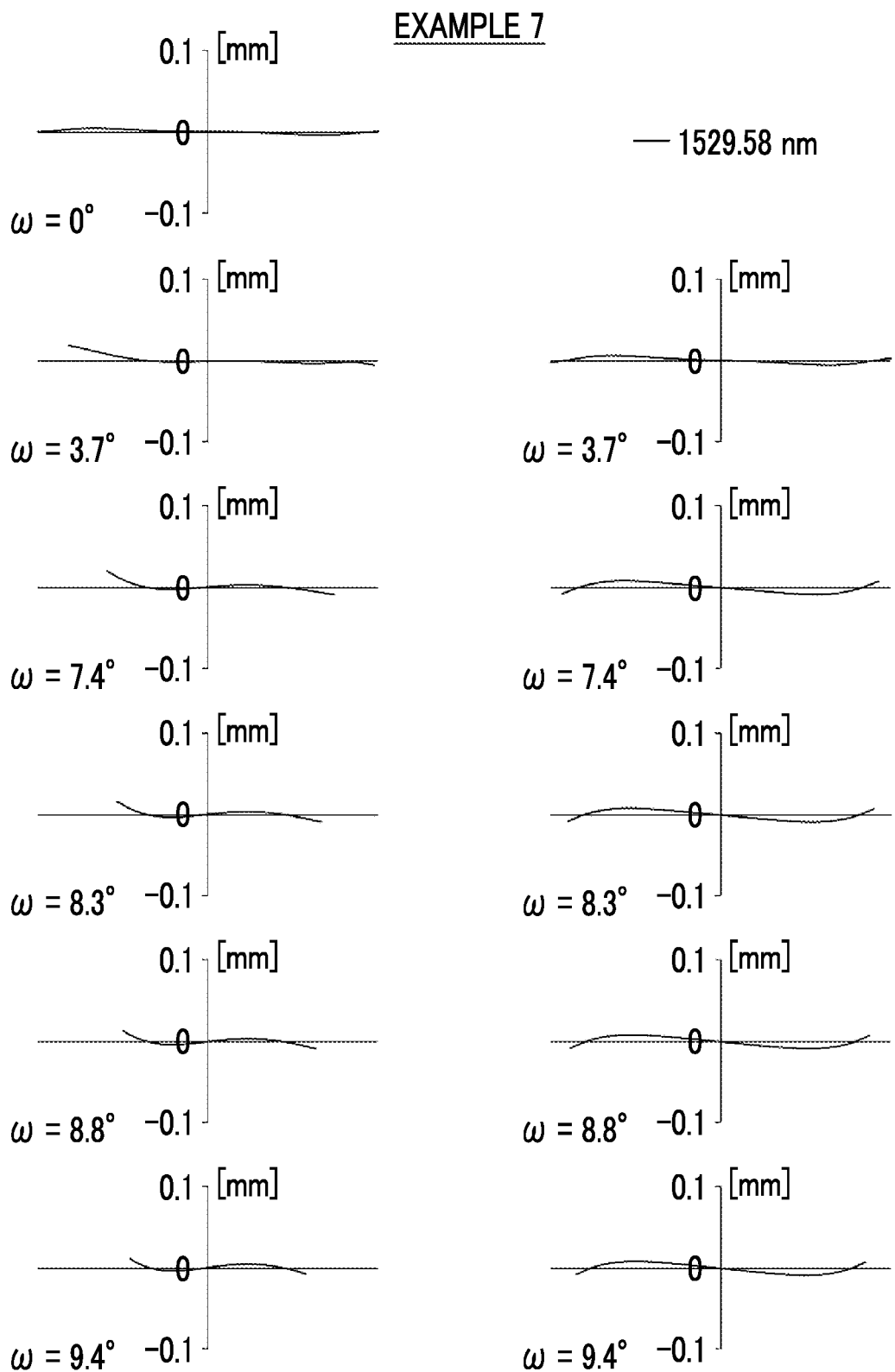
FIG. 29 is a diagram showing lateral aberrations of the imaging lens according to Example 7 of the present disclosure.

FIG. 9 is a cross-sectional view showing a configuration and luminous flux of the imaging lens according to Example 7. The imaging lens according to Example 7 has the same configuration as the outline of the imaging lens according to Example 1. Regarding the imaging lens according to Example 7, Table 13 shows basic lens data, Table 14 shows specifications, and FIGS. 19 and 29 show aberration diagrams. Among the materials shown in Table 13, the material on the ninth surface is manufactured by Schott Corporation, and the others are all manufactured by OHARA Corporation.

Example 8

Figure 10:
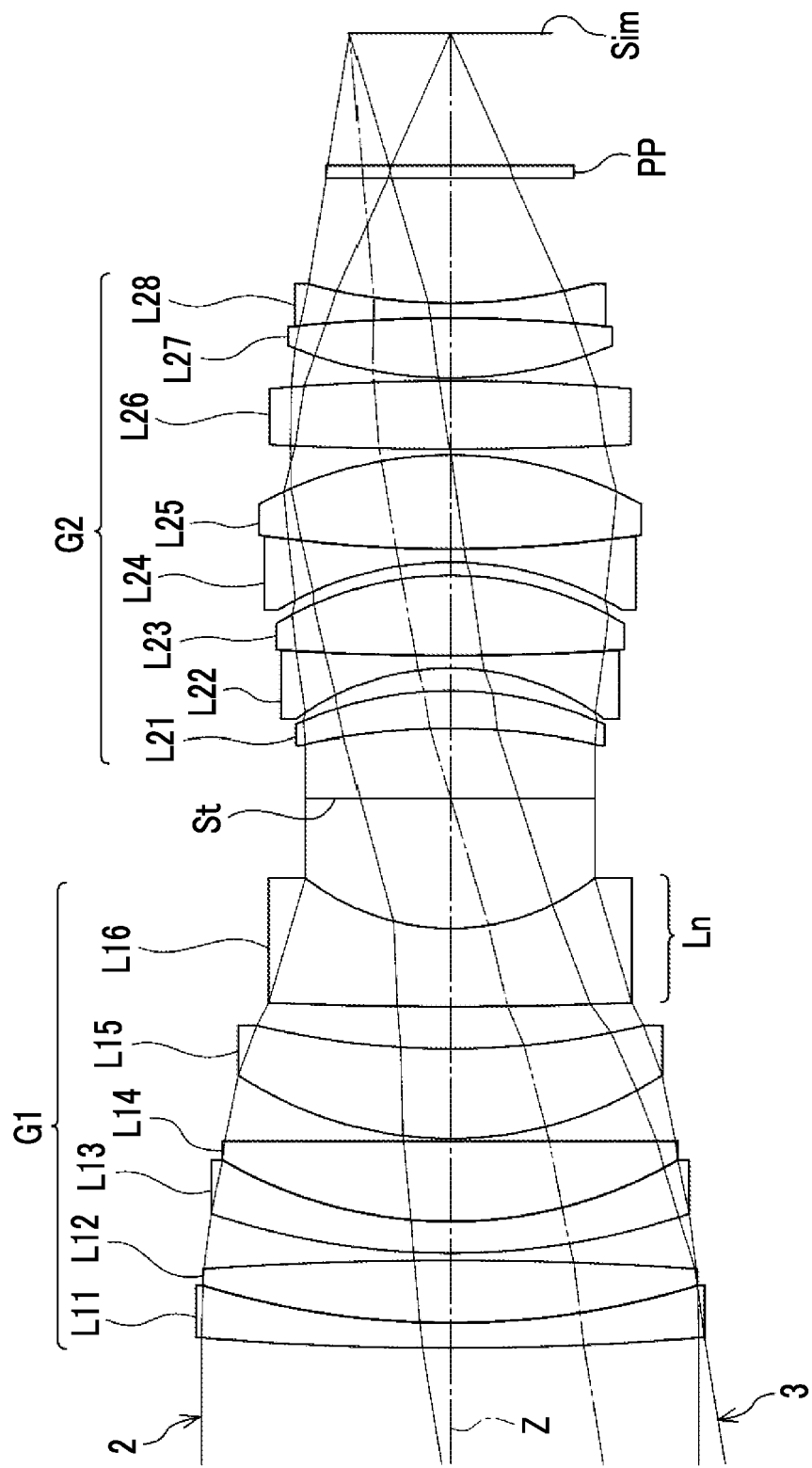
FIG. 10 is a cross-sectional view showing the configuration and luminous flux of the imaging lens according to Example 8 of the present disclosure.
Figure 20:
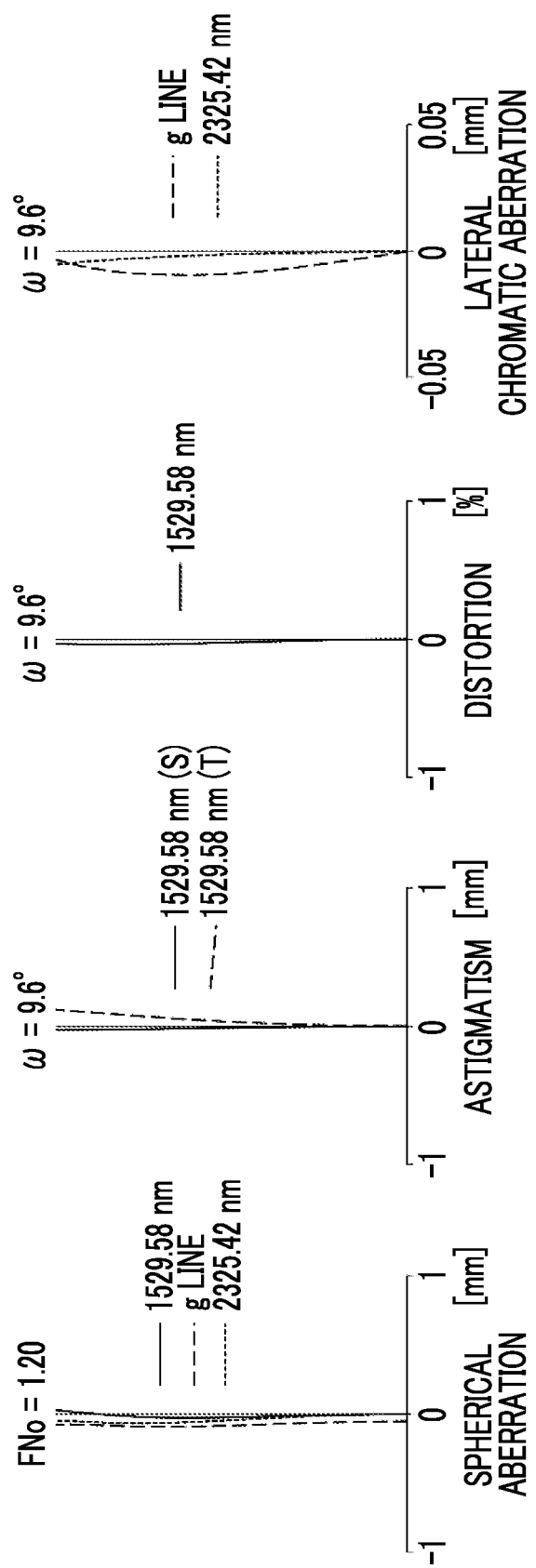
FIG. 20 is a spherical aberration diagram, an astigmatism diagram, a distortion diagram, and a lateral chromatic aberration diagram of the imaging lens according to Example 8 of the present disclosure.
Figure 30:
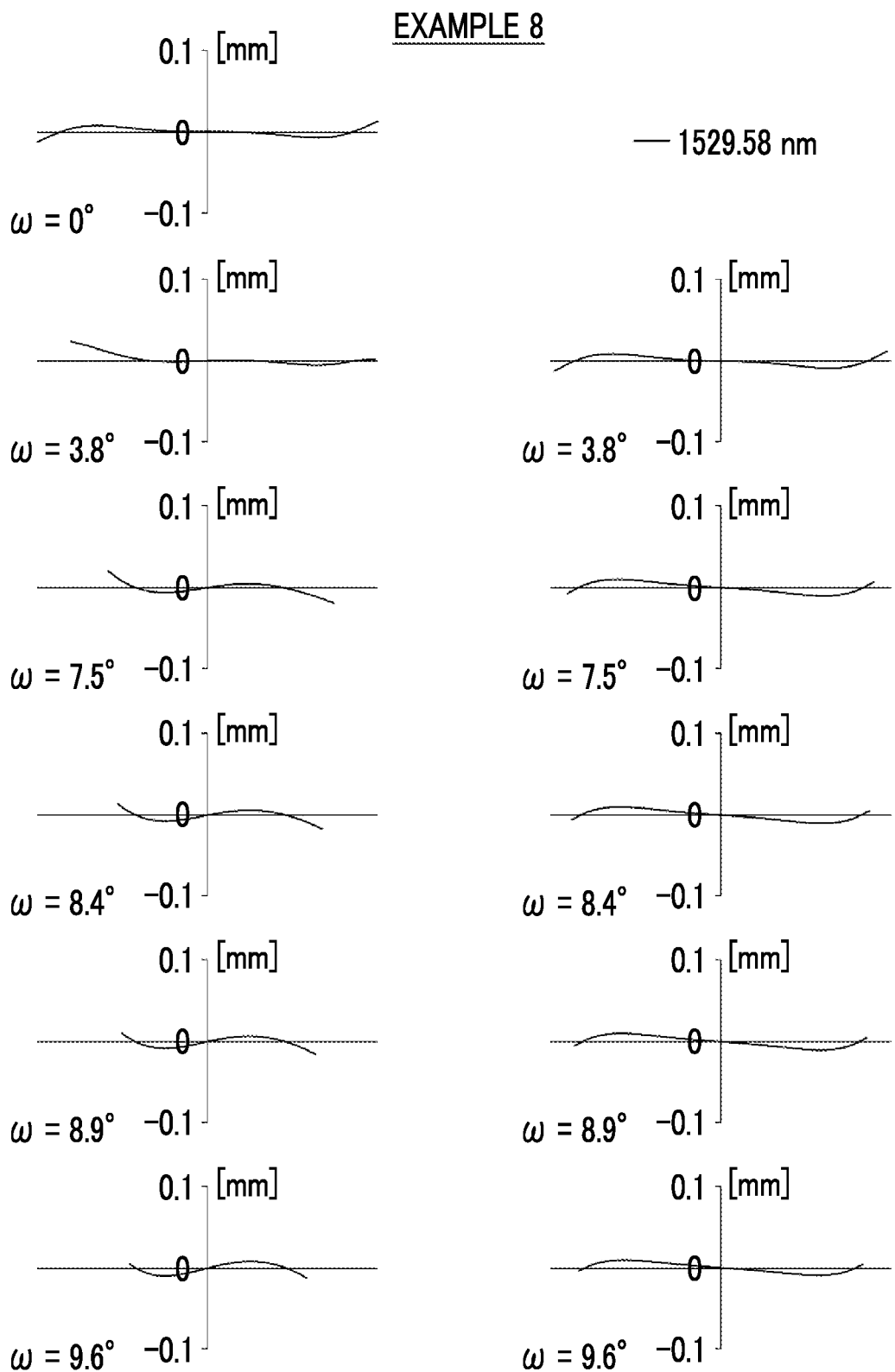
FIG. 30 is a diagram showing lateral aberrations of the imaging lens according to Example 8 of the present disclosure.

FIG. 10 is a cross-sectional view showing a configuration and luminous flux of the imaging lens according to Example 8. The imaging lens according to Example 8 has the same configuration as the outline of the imaging lens according to Example 1. Regarding the imaging lens according to Example 8, Table 15 shows basic lens data, Table 16 shows specifications, and FIGS. 20 and 30 show aberration diagrams. All the materials shown in Table 15 are manufactured by OHARA Corporation.

TABLE 13

Example 7
Based on a wavelength of 1529.58 nm

| Surface number | Curvature radius | Surface spacing | na | ν | θ | Material name | Effective diameter |
|---|---|---|---|---|---|---|---|
| 1 | 233.0659 | 3.2668 | 1.57212 | 10.54 | 0.20955 | S-TIM8 | 43.417 |
| 2 | 73.5125 | 5.5122 | 1.69511 | 12.14 | 0.21984 | S-LAM61 | 41.882 |
| 3 | −290.4460 | 0.5107 | | | | | 41.664 |
| 4 | 60.7913 | 3.0314 | 1.76125 | 6.84 | 0.14998 | S-NPH1W | 40.169 |
| 5 | 40.0607 | 6.4210 | 1.43023 | 22.04 | 0.27203 | S-FPL55 | 38.039 |
| 6 | 781.9616 | 0.4129 | | | | | 37.395 |
| 7 | 33.4679 | 7.1043 | 1.81983 | 11.31 | 0.19625 | S-LAH89 | 34.903 |
| 8 | 63.4175 | 3.7525 | | | | | 31.550 |
| 9 | 338.5375 | 6.0065 | 1.61223 | 10.25 | 0.25523 | N-KZFS11 | 29.344 |
| 10 | 19.0133 | 10.0973 | | | | | 23.275 |
| 11(St) | ∞ | 5.4174 | | | | | 22.665 |
| 12 | −56.1913 | 3.0305 | 1.91082 | 7.44 | 0.13791 | S-TIH57 | 23.430 |
| 13 | −31.4875 | 1.6000 | | | | | 23.993 |
| 14 | −21.3189 | 1.0429 | 1.67369 | 12.44 | 0.28611 | S-LAL14 | 23.942 |
| 15 | 317.5528 | 6.7014 | 1.86834 | 10.26 | 0.16937 | S-LAH93 | 26.064 |
| 16 | −28.7402 | 0.2000 | | | | | 27.181 |
| 17 | −27.7747 | 1.5373 | 1.83681 | 6.26 | 0.13587 | S-NPH4 | 27.166 |
| 18 | 135.7785 | 7.8843 | 1.95440 | 8.89 | 0.14688 | S-LAH99 | 29.397 |
| 19 | −32.8215 | 0.4312 | | | | | 30.530 |
| 20 | 312.4389 | 3.9961 | 1.85686 | 10.69 | 0.17806 | S-LAH92 | 29.010 |
| 21 | −165.6147 | 0.2046 | | | | | 28.332 |
| 22 | 35.0887 | 4.4591 | 1.85023 | 11.40 | 0.19209 | S-LAH58 | 26.351 |
| 23 | −157.0999 | 1.1371 | 1.89131 | 5.43 | 0.12585 | S-NPH3 | 25.402 |
| 24# | 46.6103 | 10.0000 | | | | | 23.356 |
| 25 | ∞ | 1.0000 | 1.50050 | 13.45 | 0.30924 | S-BSL7 | 20.582 |
| 26 | ∞ | 10.3773 | | | | | 20.380 |

TABLE 15

Example 8
Based on a wavelength of 1529.58 nm

| Surface number | Curvature radius | Surface spacing | na | ν | θ | Material name | Effective diameter |
|---|---|---|---|---|---|---|---|
| 1 | 246.3845 | 2.0109 | 1.57212 | 10.54 | 0.20955 | S-TIM8 | 41.532 |
| 2 | 69.4971 | 4.9951 | 1.69511 | 12.14 | 0.21984 | S-LAM61 | 40.352 |
| 3 | −293.8219 | 0.5786 | | | | | 40.221 |
| 4 | 61.9617 | 2.5106 | 1.76125 | 6.84 | 0.14998 | S-NPH1W | 39.041 |
| 5 | 37.5692 | 6.4358 | 1.43023 | 22.04 | 0.27203 | S-FPL55 | 37.176 |
| 6 | 24048.4927 | 0.2002 | | | | | 36.747 |
| 7 | 32.0446 | 7.1741 | 1.81983 | 11.31 | 0.19625 | S-LAH89 | 34.594 |
| 8 | 67.7948 | 3.3643 | | | | | 31.514 |
| 9 | 354.4893 | 6.2469 | 1.71730 | 11.91 | 0.25714 | S-LAM60 | 29.602 |
| 10 | 19.2487 | 10.3623 | | | | | 23.570 |
| 11(St) | ∞ | 5.5341 | | | | | 23.585 |
| 12 | −58.6117 | 3.0102 | 1.91082 | 7.44 | 0.13791 | S-T1H57 | 24.728 |
| 13 | −30.7701 | 1.7943 | | | | | 25.288 |
| 14 | −21.4917 | 1.0230 | 1.67369 | 12.44 | 0.28611 | S-LAL14 | 25.227 |
| 15 | 222.5981 | 6.3880 | 1.86834 | 10.26 | 0.16937 | S-LAH93 | 27.854 |
| 16 | −28.0645 | 1.0579 | | | | | 28.674 |
| 17 | −27.8209 | 1.0582 | 1.83681 | 6.26 | 0.13587 | S-NPH4 | 28.395 |
| 18 | 110.1322 | 7.4972 | 1.95440 | 8.89 | 0.14688 | S-LAH99 | 30.775 |
| 19 | −33.0024 | 0.4922 | | | | | 31.612 |
| 20 | 313.5132 | 5.4357 | 1.85686 | 10.69 | 0.17806 | S-LAH92 | 29.874 |
| 21 | −171.6558 | 0.2375 | | | | | 28.824 |
| 22 | 35.2421 | 4.7721 | 1.85023 | 11.40 | 0.19209 | S-LAH58 | 26.711 |
| 23 | −123.9159 | 1.1925 | 1.89131 | 5.43 | 0.12585 | S-NPH3 | 25.669 |
| 24# | 44.2399 | 10.0000 | | | | | 23.337 |
| 25 | ∞ | 1.0000 | 1.50050 | 13.45 | 0.30924 | S-BSL7 | 20.602 |
| 26 | ∞ | 10.5365 | | | | | 20.401 |

TABLE 16

Example 8
Based on a wavelength of 1529.58 nm

| | |
|---|---|
| f | 48.70 |
| Bf | 21.20 |
| FNo | 1.20 |
| 2ω(°) | 19.2 |

Example 9

Figure 11:
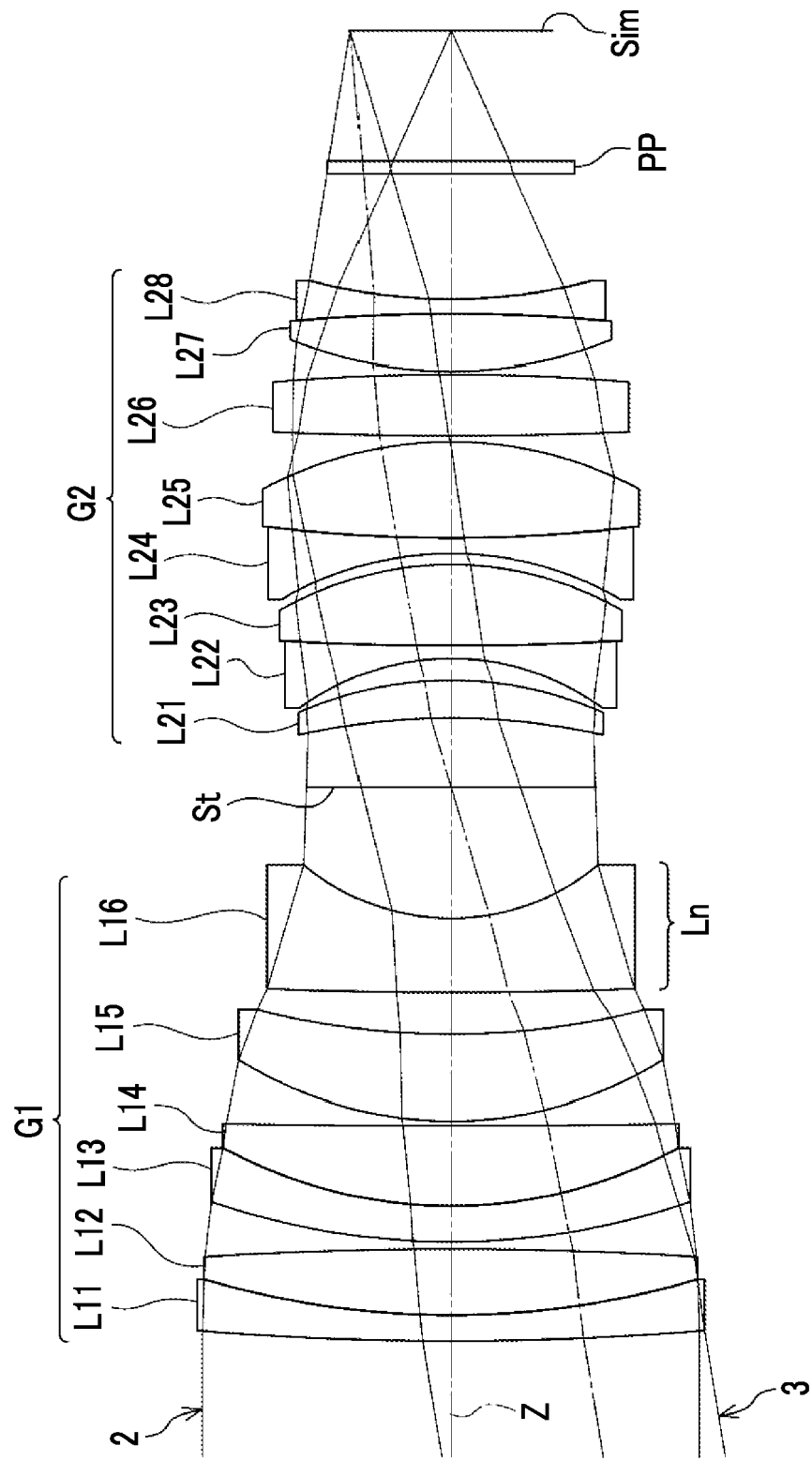
FIG. 11 is a cross-sectional view showing the configuration and luminous flux of the imaging lens according to Example 9 of the present disclosure.
Figure 21:
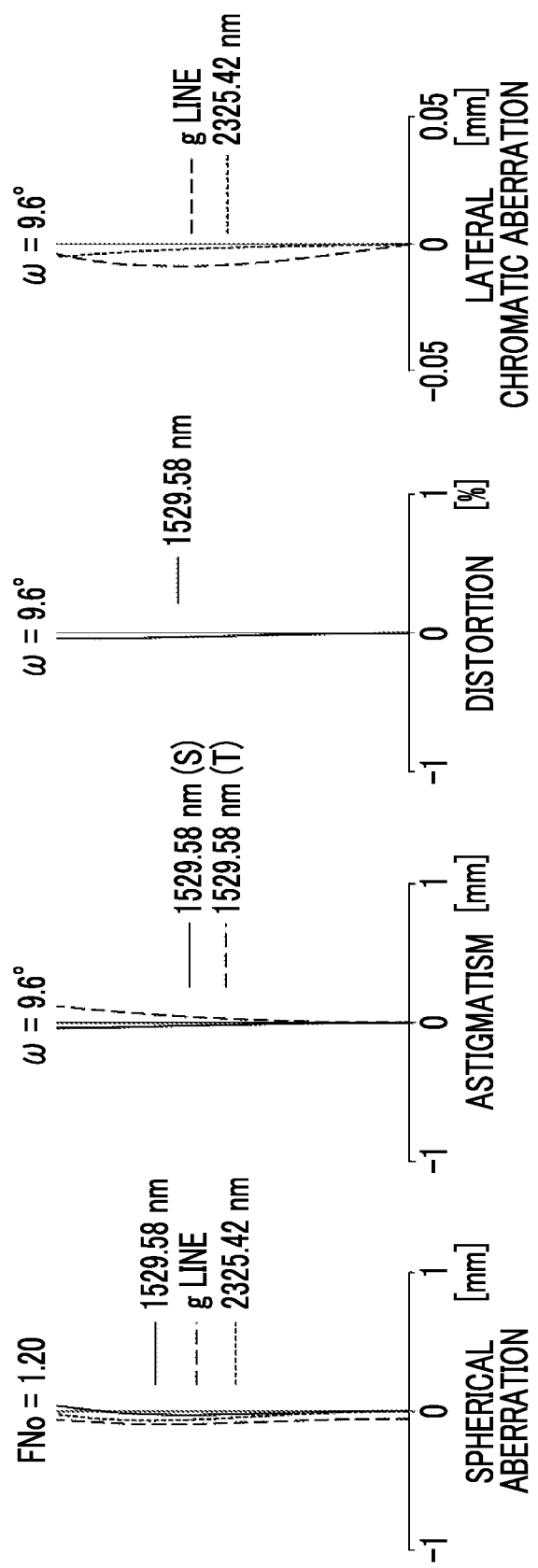
FIG. 21 is a spherical aberration diagram, an astigmatism diagram, a distortion diagram, and a lateral chromatic aberration diagram of the imaging lens according to Example 9 of the present disclosure.
Figure 31:
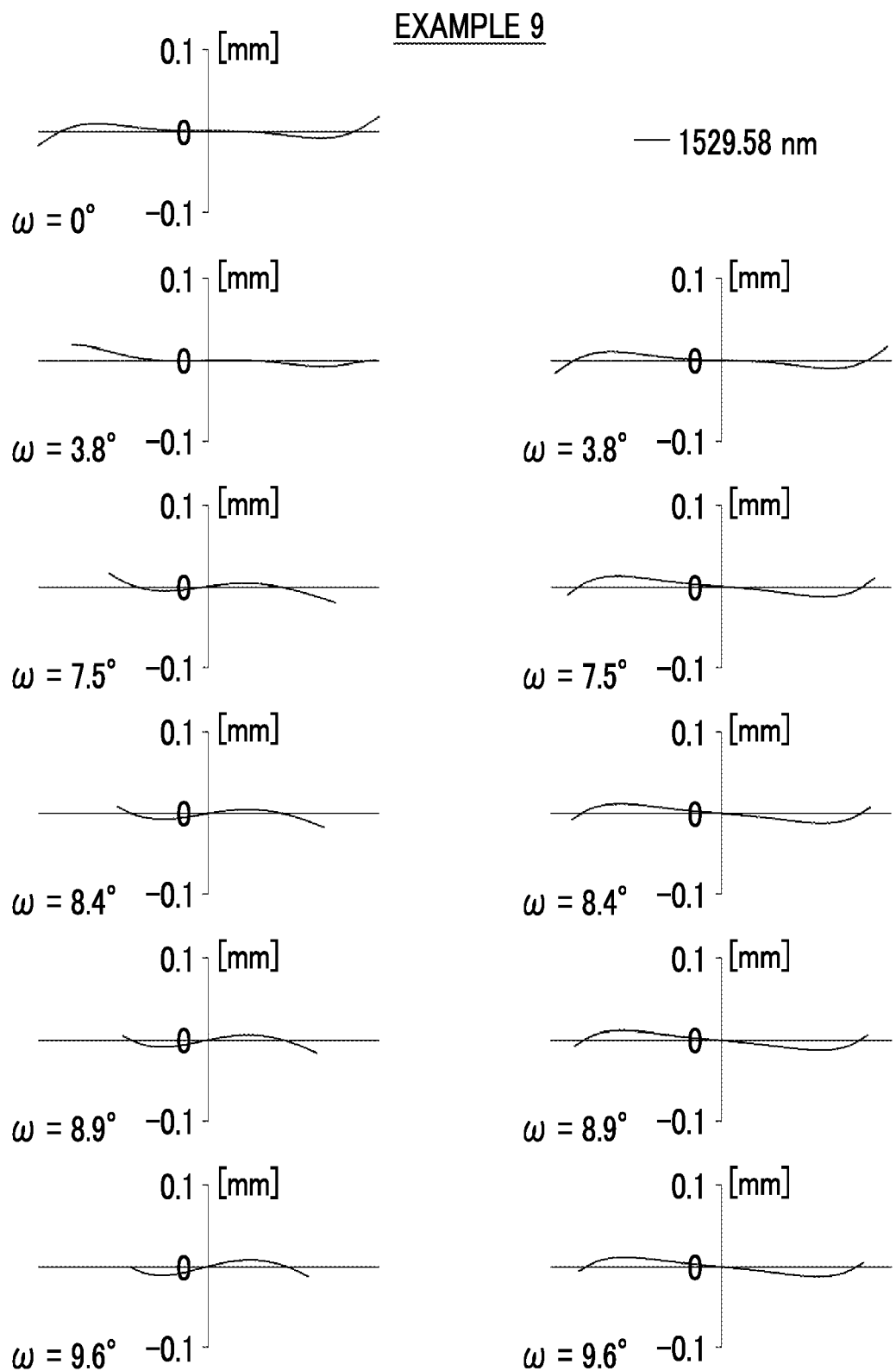
FIG. 31 is a diagram showing lateral aberrations of the imaging lens according to Example 9 of the present disclosure.

FIG. 11 is a cross-sectional view showing a configuration and luminous flux of the imaging lens according to Example 9. The imaging lens according to Example 9 has the same configuration as the outline of the imaging lens according to Example 1. Regarding the imaging lens according to Example 9, Table 17 shows basic lens data, Table 18 shows specifications, and FIGS. 21 and 31 show aberration diagrams. All the materials shown in Table 17 are manufactured by OHARA Corporation.

TABLE 17

Example 9
Based on a wavelength of 1529.58 nm

| Surface number | Curvature radius | Surface spacing | na | ν | θ | Material name | Effective diameter |
|---|---|---|---|---|---|---|---|
| 1 | 256.7190 | 2.0661 | 1.57212 | 10.54 | 0.20955 | S-TIM8 | 41.372 |
| 2 | 72.4674 | 5.2635 | 1.69511 | 12.14 | 0.21984 | S-LAM61 | 40.214 |
| 3 | −318.7858 | 0.5772 | | | | | 40.044 |
| 4 | 61.2609 | 2.8554 | 1.76125 | 6.84 | 0.14998 | S-NPH1W | 38.945 |
| 5 | 39.5266 | 6.3672 | 1.43023 | 22.04 | 0.27203 | S-FPL55 | 37.098 |
| 6 | 995.2031 | 0.3771 | | | | | 36.544 |
| 7 | 33.2133 | 6.8744 | 1.81983 | 11.31 | 0.19625 | S-LAH89 | 34.508 |
| 8 | 64.3989 | 3.3254 | | | | | 31.515 |
| 9 | 387.2007 | 5.9106 | 1.59012 | 10.87 | 0.24894 | S-NBM51 | 29.914 |
| 10 | 19.0107 | 10.4534 | | | | | 23.961 |
| 11(St) | ∞ | 5.5122 | | | | | 23.533 |
| 12 | −57.3285 | 3.0058 | 1.91082 | 7.44 | 0.13791 | S-TIH57 | 24.377 |
| 13 | −31.1264 | 1.7353 | | | | | 24.912 |
| 14 | −21.3006 | 1.0263 | 1.67369 | 12.44 | 0.28611 | S-LAL14 | 24.847 |
| 15 | 243.5472 | 6.4571 | 1.86834 | 10.26 | 0.16937 | S-LAH93 | 27.249 |
| 16 | −28.4003 | 0.8906 | | | | | 28.147 |
| 17 | −27.8495 | 1.2352 | 1.83681 | 6.26 | 0.13587 | S-NPH4 | 27.919 |
| 18 | 125.0805 | 7.6637 | 1.95440 | 8.89 | 0.14688 | S-LAH99 | 30.153 |
| 19 | −32.9001 | 0.4754 | | | | | 31.116 |
| 20 | 339.5550 | 4.8862 | 1.85686 | 10.69 | 0.17806 | S-LAH92 | 29.399 |
| 21 | −175.3408 | 0.2279 | | | | | 28.461 |

TABLE 17-continued

Example 9
Based on a wavelength of 1529.58 nm

| Surface number | Curvature radius | Surface spacing | na | ν | θ | Material name | Effective diameter |
|---|---|---|---|---|---|---|---|
| 22 | 35.3783 | 4.5471 | 1.85023 | 11.40 | 0.19209 | S-LAH58 | 26.429 |
| 23 | −142.4653 | 1.1606 | 1.89131 | 5.43 | 0.12585 | S-NPH3 | 25.442 |
| 24# | 45.3317 | 10.0000 | | | | | 23.263 |
| 25 | ∞ | 1.0000 | 1.50050 | 13.45 | 0.30924 | S-BSL7 | 20.542 |
| 26 | ∞ | 10.3850 | | | | | 20.342 |

TABLE 18

Example 9
Based on a wavelength of 1529.58 nm

| | |
|---|---|
| f | 48.54 |
| Bf | 21.05 |
| FNo | 1.20 |
| 2ω(°) | 19.2 |

Example 10

Figure 12:
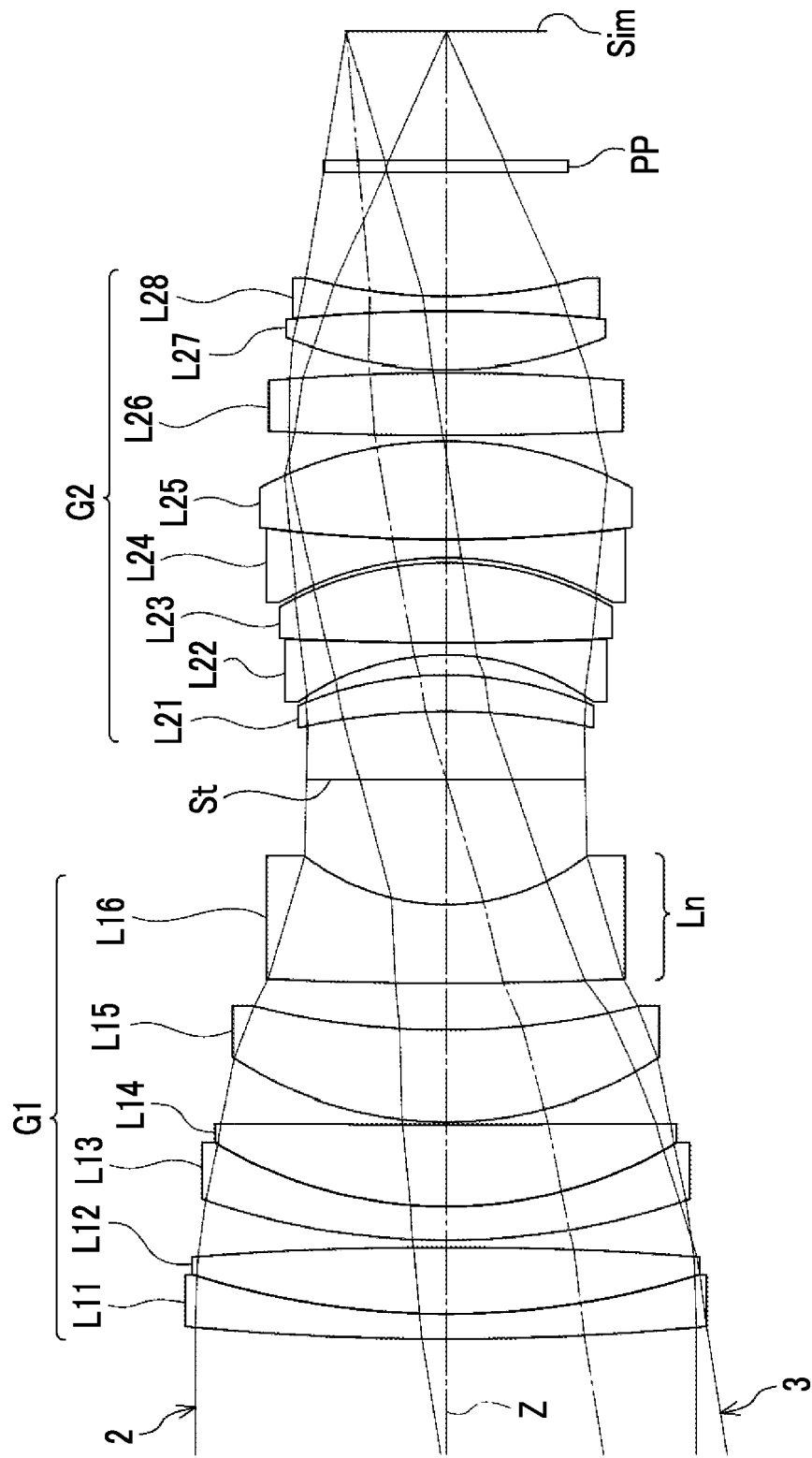
FIG. 12 is a cross-sectional view showing the configuration and luminous flux of the imaging lens according to Example 10 of the present disclosure.
Figure 22:
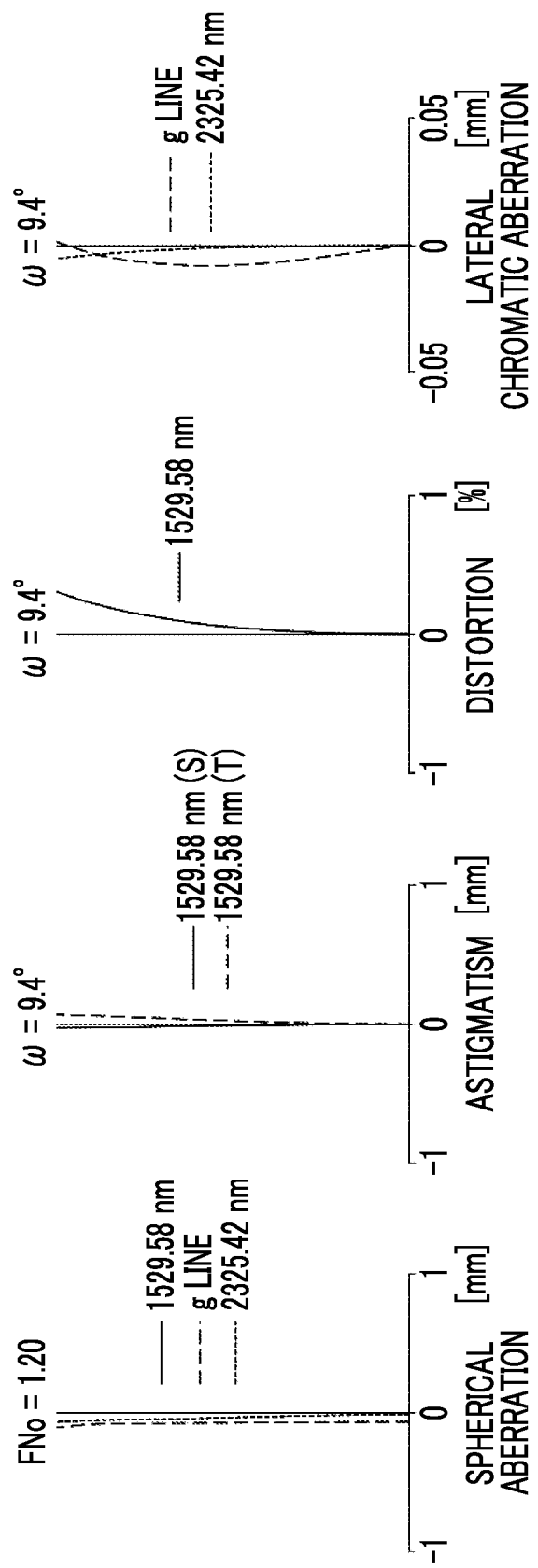
FIG. 22 is a spherical aberration diagram, an astigmatism diagram, a distortion diagram, and a lateral chromatic aberration diagram of the imaging lens according to Example 10 of the present disclosure.
Figure 32:
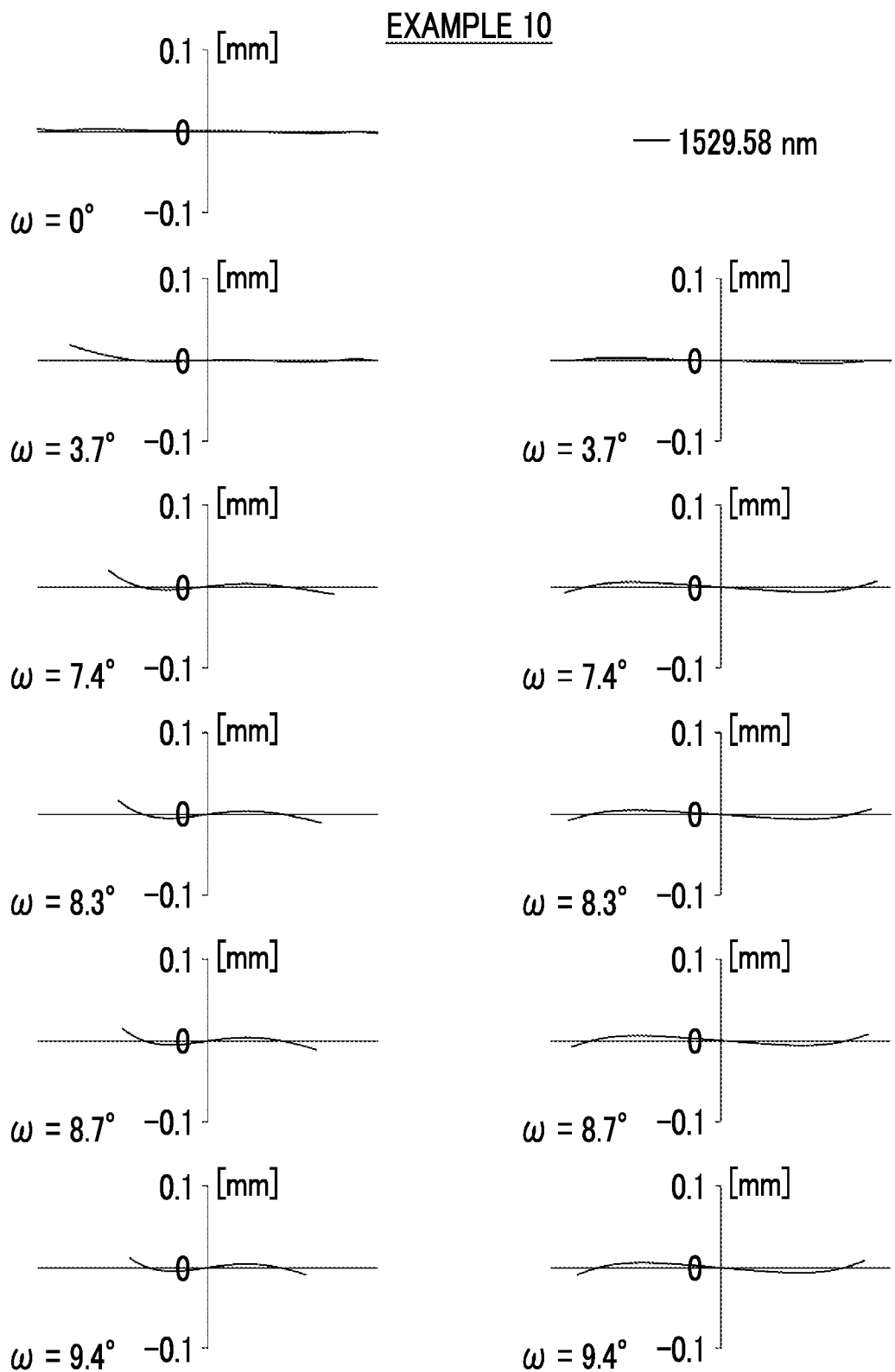
FIG. 32 is a diagram showing lateral aberrations of the imaging lens according to Example 10 of the present disclosure.

FIG. 12 is a cross-sectional view showing a configuration and luminous flux of the imaging lens according to Example 10. The imaging lens according to Example 10 has the same configuration as the outline of the imaging lens according to Example 1. Regarding the imaging lens according to Example 10, Table 19 shows basic lens data, Table 20 shows specifications, and FIGS. 22 and 32 show aberration diagrams. Among the materials shown in Table 19, the material on the ninth surface is manufactured by Schott Corporation, and the others are all manufactured by OHARA Corporation.

TABLE 19

Example 10
Based on a wavelength of 1529.58 nm

| Surface number | Curvature radius | Surface spacing | na | ν | θ | Material name | Effective diameter |
|---|---|---|---|---|---|---|---|
| 1 | 233.4146 | 2.0101 | 1.57212 | 10.54 | 0.20955 | S-TIM8 | 43.055 |
| 2 | 70.1311 | 5.3841 | 1.69511 | 12.14 | 0.21984 | S-LAM61 | 41.846 |
| 3 | −278.9553 | 0.5659 | | | | | 41.665 |
| 4 | 62.3548 | 2.7199 | 1.76125 | 6.84 | 0.14998 | S-NPH1W | 40.139 |
| 5 | 37.7582 | 6.6088 | 1.43023 | 22.04 | 0.27203 | S-FPL55 | 37.978 |
| 6 | 3248.9445 | 0.2002 | | | | | 37.474 |
| 7 | 32.5204 | 7.3676 | 1.81983 | 11.31 | 0.19625 | S-LAH89 | 34.990 |
| 8 | 66.1279 | 3.7828 | | | | | 31.610 |
| 9 | 325.2318 | 6.3379 | 1.69488 | 11.80 | 0.27135 | N-LAK10 | 29.311 |
| 10 | 19.1264 | 10.1037 | | | | | 23.226 |
| 11(St) | ∞ | 5.4802 | | | | | 22.956 |
| 12 | −57.0491 | 2.9322 | 1.91082 | 7.44 | 0.13791 | S-TIH57 | 23.947 |
| 13 | −31.3131 | 1.6216 | | | | | 24.505 |
| 14 | −21.5365 | 1.0099 | 1.67369 | 12.44 | 0.28611 | S-LAL14 | 24.462 |
| 15 | 280.3308 | 6.4364 | 1.86834 | 10.26 | 0.16937 | S-LAH93 | 26.786 |
| 16 | −28.1735 | 0.4144 | | | | | 27.751 |
| 17 | −27.8678 | 1.4693 | 1.83681 | 6.26 | 0.13587 | S-NPH4 | 27.659 |
| 18 | 121.1944 | 7.9433 | 1.95440 | 8.89 | 0.14688 | S-LAH99 | 29.999 |
| 19 | −33.1571 | 0.4649 | | | | | 31.082 |
| 20 | 301.9483 | 5.0492 | 1.85686 | 10.69 | 0.17806 | S-LAH92 | 29.493 |
| 21 | −168.6246 | 0.2241 | | | | | 28.569 |
| 22 | 34.8929 | 4.6889 | 1.85023 | 11.40 | 0.19209 | S-LAH58 | 26.523 |
| 23 | −129.6801 | 1.1843 | 1.89131 | 5.43 | 0.12585 | S-NPH3 | 25.518 |
| 24# | 45.0835 | 10.0000 | | | | | 23.314 |
| 25 | ∞ | 1.0000 | 1.50050 | 13.45 | 0.30924 | S-BSL7 | 20.573 |
| 26 | ∞ | 10.3814 | | | | | 20.371 |

TABLE 20

Example 10
Based on a wavelength of 1529.58 nm

| | |
|---|---|
| f | 49.54 |
| Bf | 21.04 |
| FNo | 1.20 |
| 2ω(°) | 18.8 |

Table 21 shows the corresponding values of Conditional Expressions (1) to (8) of the imaging lenses of Examples 1 to 10.

TABLE 21

| Expression number | | Example 1 | Example 2 | Example 3 | Example 4 | Example 5 |
|---|---|---|---|---|---|---|
| (1) | vPave-vNave | 2.47 | 2.15 | 2.76 | 2.05 | 2.08 |
| (2) | θPave-θNave | −0.014 | −0.024 | −0.012 | −0.027 | −0.028 |
| (3) | FNo | 1.2 | 1.2 | 1.2 | 1.2 | 1.2 |
| (4) | \|CRA\| | 6.49 | 4.99 | 5.85 | 4.98 | 4.98 |
| (5) | $\dfrac{URA - CRA}{(180/\pi) \times \arcsin\{1/(2 \times FNo)\}}$ | 0.67 | 0.60 | 0.64 | 0.59 | 0.59 |
| (6) | fn/f | −0.64 | −0.67 | −0.65 | −0.71 | −0.71 |
| (7) | TL/f | 2.11 | 1.95 | 2.12 | 2.00 | 1.99 |
| (8) | fG2/fG1 | 0.11 | 0.21 | 0.12 | 0.20 | 0.20 |
| | | Example 6 | Example 7 | Example 8 | Example 9 | Example 10 |
| (1) | vPave-vNave | 2.55 | 3.14 | 2.87 | 3.04 | 2.89 |
| (2) | θPave-θNave | −0.008 | −0.005 | −0.005 | −0.004 | −0.007 |
| (3) | FNo | 1.2 | 1.2 | 1.2 | 1.2 | 1.2 |
| (4) | \|CRA\| | 5.51 | 5.10 | 5.31 | 5.32 | 5.16 |
| (5) | $\dfrac{URA - CRA}{(180/\pi) \times \arcsin\{1/(2 \times FNo)\}}$ | 0.65 | 0.60 | 0.61 | 0.61 | 0.60 |
| (6) | fn/f | −0.70 | −0.67 | −0.59 | −0.70 | −0.60 |
| (7) | TL/f | 2.16 | 2.13 | 2.15 | 2.14 | 2.12 |
| (8) | fG2/fG1 | 0.11 | 0.13 | 0.08 | 0.12 | 0.10 |

As can be seen from the above data, the imaging lenses of Examples 1 to 10 each have a small F number of less than 1.3, but the enlargement of the lens system is suppressed, and various aberrations are satisfactorily corrected throughout a wide wavelength band from the visible region to the SWIR region. As a result, high optical performance is achieved.

Figure 33:
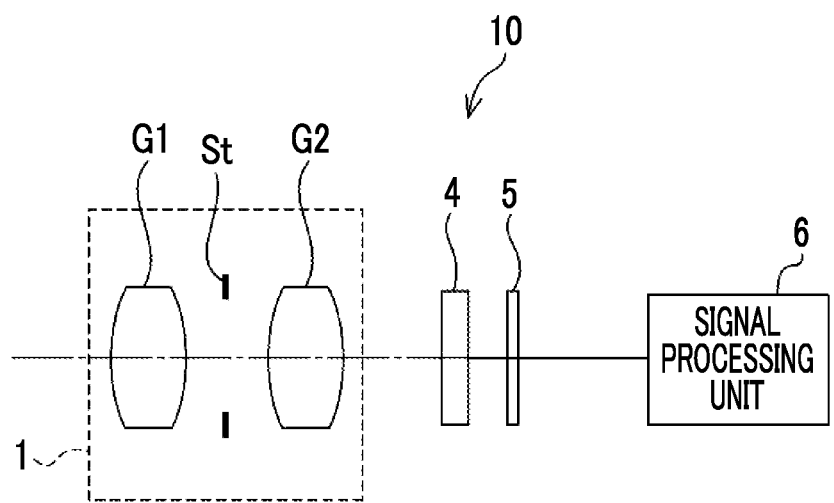
FIG. 33 is a schematic configuration diagram of an imaging apparatus according to an embodiment of the present disclosure.

Next, an imaging apparatus according to an embodiment of the present disclosure will be described. FIG. 33 shows a schematic configuration diagram of an imaging apparatus 10 using the imaging lens 1 according to the embodiment of the present disclosure as the imaging apparatus according to the embodiment of the present disclosure. Examples of the imaging apparatus 10 include an FA camera, a MV camera, a digital camera, a surveillance camera, an in-vehicle camera, a cinema camera, and the like. The imaging apparatus 10 is a camera compatible with a visible region and a SWIR region.

The imaging apparatus 10 includes an imaging lens 1, a filter 4 disposed on the image side of the imaging lens 1, an imaging element 5, and a signal processing unit 6 that performs arithmetic processing on an output signal from the imaging element 5. In FIG. 33, the first lens group G1, the aperture stop St, and the second lens group G2 included in the imaging lens 1 are conceptually illustrated. The imaging element 5 captures an image of a subject formed by the imaging lens 1 and converts the image into an electric signal, and for example, a complementary metal oxide semiconductor (CMOS) sensor, a charge coupled device (CCD) sensor, or the like can be used. The imaging element 5 is disposed such that the imaging surface thereof coincides with the image plane Sim of the imaging lens 1.

Although FIG. 33 shows only one imaging element 5, the imaging apparatus 10 may be configured to comprise a plurality of imaging elements. The imaging apparatus 10 may be configured such that a spectroscopic prism and/or a dichroic mirror is inserted at any position on the optical axis of the optical system to branch the light for each wavelength and capture an image with different imaging elements.

The technology of the present disclosure has been hitherto described through embodiments and examples, but the technology of the present disclosure is not limited to the above-mentioned embodiments and examples, and may be modified into various forms. For example, values such as the curvature radius, the surface spacing, the refractive index, the Abbe number, and the partial dispersion ratio of each lens are not limited to the values shown in the examples, and different values may be used therefor.

Further, although the aberration diagrams of the above-described examples show the g line (a wavelength of 435.83 nm) to a wavelength of 2325.42 nm, the technique of the present disclosure is not limited to this wavelength range, and may be applied to an imaging lens in which the wavelength range is expanded or contracted.

The imaging apparatus according to the embodiment of the present disclosure is not limited to the cameras corresponding to the visible region and the SWIR region, and the techniques of the present disclosure can also be applied to a visible region camera, a SWIR region camera, a multispectral camera, and a hyperspectral camera, a thermography camera, and the like.

All documents, patent applications, and technical standards described in the present specification are incorporated into the present specification by reference to the same extent as in a case where the individual documents, patent applications, and technical standards were specifically and individually stated to be incorporated by reference.

What is claimed is:

1. An imaging lens consisting of, in order from an object side to an image side: a first lens group that has a positive refractive power; a stop; and a second lens group that has a positive refractive power, wherein an Ln lens, which is a negative lens having an absolute value of a curvature radius of an image side surface smaller than an absolute value of a curvature radius of an object side surface, is disposed at a position closest to the image side in the first lens group, assuming that a refractive index of each lens of the first lens group and the second lens group at a wavelength of 435.83 nm is ng, a refractive index thereof at a wavelength of 1529.58 nm is na, and a refractive index thereof at a wavelength of 2325.42 nm is nb, and an Abbe number ν and a partial dispersion ratio θ are respectively defined by $$\nu = (na-1)/(ng-nb), \text{ and}$$

$$\theta = (na-nb)/(ng-nb),$$

in a Cartesian coordinate system where a horizontal axis is ν and a vertical axis is θ, ν and θ of the Ln lens are included in a common region of three regions including a first region represented by $\theta > 0.0060 \times \nu + 0.1712$, a second region represented by $\theta < 0.0327 \times \nu - 0.0635$, and a third region represented by $\nu < 14.8$, and two groups of cemented lenses in which a negative lens and a positive lens are cemented in order from the object side are disposed successively in order from a position closest to the object side toward the image side.

2. The imaging lens according to claim 1, wherein assuming that an average of ν of all positive lenses of the imaging lens is νPave, an average of ν of all negative lenses of the imaging lens is νNave, an average of θ of all the positive lenses of the imaging lens is θPave, and an average of θ of all the negative lenses of the imaging lens is θNave, Conditional Expressions (1) and (2) are satisfied, which are represented by $$1 < \nu Pave - \nu Nave < 4, \text{ and} \quad (1)$$

$$-0.05 < \theta Pave - \theta Nave < 0. \quad (2)$$

3. The imaging lens according to claim 2, wherein Conditional Expression (1-1) is satisfied, which is represented by $$1.5 < \nu Pave - \nu Nave < 3.5. \quad (1\text{-}1)$$

4. The imaging lens according to claim 2, wherein Conditional Expression (2-1) is satisfied, which is represented by $$-0.04 < \theta Pave - \theta Nave < -0.002. \quad (2\text{-}1)$$

5. The imaging lens according to claim 1, wherein assuming that an open F number of the imaging lens is FNo, an angle, which is formed between an axis parallel to an optical axis and a principal ray incident on an image plane at a maximum image height, is CRA, an angle, which is formed between the axis and a marginal ray farthest from the optical axis among the rays incident on the image plane at the maximum image height in a state where the stop is open, is URA, a sign of CRA in a case where the principal ray is on an optical axis side is negative and a sign of CRA in a case where the principal ray is on a side opposite to the optical axis side is positive with reference to the axis passing through the maximum image height, a sign of URA in a case where the marginal ray is on the optical axis side is negative and a sign of URA in a case where the marginal ray is on the side opposite to the optical axis side is positive with reference to the axis passing through the maximum image height, and units of CRA and URA are degrees, Conditional Expressions (3), (4), and (5) are satisfied, which are represented by $$FNo \leq 1.4, \quad (3)$$

$$0 \leq |CRA| < 8, \text{ and} \quad (4)$$

$$0.4 < \frac{URA - CRA}{(180/\pi) \times \arcsin\{1/(2 \times FNo)\}} < 0.95. \quad (5)$$

6. The imaging lens according to claim 5, wherein Conditional Expression (3-1) is satisfied, which is represented by $$1 \leq FNo \leq 1.3. \quad (3\text{-}1)$$

7. The imaging lens according to claim 5, wherein Conditional Expression (4-1) is satisfied, which is represented by $$0 \leq |CRA| < 7. \quad (4\text{-}1)$$

8. The imaging lens according to claim 5, wherein Conditional Expression (5-1) is satisfied, which is represented by $$0.5 < \frac{URA - CRA}{(180/\pi) \times \arcsin\{1/(2 \times FNo)\}} < 0.08. \quad (5\text{-}1)$$

9. The imaging lens according to claim 1, wherein assuming that
a focal length of the Ln lens at a wavelength of 1529.58 nm is fn, and
a focal length of the imaging lens at a wavelength of 1529.58 nm is f,
Conditional Expression (6) is satisfied, which is represented by $$-0.8 < fn/f < -0.5. \quad (6)$$

10. The imaging lens according to claim 9, wherein Conditional Expression (6-1) is satisfied, which is represented by $$-0.75 < fn/f < -0.55. \quad (6\text{-}1)$$

11. The imaging lens according to claim 1, wherein assuming that
a sum of a distance on an optical axis from a lens surface closest to the object side in the imaging lens to a lens surface closest to the image side in the imaging lens and a back focal length at an air conversion distance of the imaging lens at a wavelength of 1529.58 nm is TL, and
a focal length of the imaging lens at a wavelength of 1529.58 nm is f,
Conditional Expression (7) is satisfied, which is represented by $$1.5 < TL/f < 2.5. \quad (7)$$

12. The imaging lens according to claim 11, wherein Conditional Expression (7-1) is satisfied, which is represented by $$1.8 < TL/f < 2.2. \quad (7\text{-}1)$$

13. The imaging lens according to claim 1, wherein assuming that
a focal length of the first lens group at a wavelength of 1529.58 nm is fG1, and
a focal length of the second lens group at a wavelength of 1529.58 nm is fG2,
Conditional Expression (8) is satisfied, which is represented by $$0.02 < fG2/fG1 < 0.3. \quad (8)$$

14. The imaging lens according to claim 1, wherein the Ln lens is a single lens.

15. The imaging lens according to claim 1, wherein a positive meniscus lens of which an image side surface is a convex surface is disposed closest to the object side in the second lens group.

16. The imaging lens according to claim 1, wherein the number of lenses included in the first lens group is 6 or less.

17. The imaging lens according to claim 1, wherein the number of lenses included in the second lens group is 8 or less.

18. The imaging lens according to claim 1, wherein ν and θ of the Ln lens are included in a common region of three regions including
a fourth region represented by θ>0.0102×ν+0.1344,
a fifth region represented by θ<0.0242×ν+0.0106, and
a sixth region represented by ν<14.3.

19. An imaging apparatus comprising the imaging lens according to claim 1.

20. The imaging lens according to claim 1, wherein the number of positive lenses included in the second lens group is 4 or more.

21. The imaging lens according to claim 1, wherein the number of negative lenses included in the second lens group is 3.

* * * * *